US011182268B2

(12) United States Patent
Khetarpal et al.

(10) Patent No.: US 11,182,268 B2
(45) Date of Patent: Nov. 23, 2021

(54) VISUALIZING USER FLOW INSIGHTS ON A GRAPHICAL USER INTERFACE

(71) Applicant: VMWARE, INC., Palo Alto, CA (US)

(72) Inventors: Anar Khetarpal, Santa Clara, CA (US); Andrew Levy, San Mateo, CA (US); Amit Sharma, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 33 days.

(21) Appl. No.: 16/675,415

(22) Filed: Nov. 6, 2019

(65) Prior Publication Data

US 2021/0133072 A1    May 6, 2021

(51) Int. Cl.
*G06F 11/32* (2006.01)
*G06F 11/30* (2006.01)

(52) U.S. Cl.
CPC .......... *G06F 11/321* (2013.01); *G06F 11/302* (2013.01); *G06F 11/3075* (2013.01); *G06F 11/323* (2013.01); *G06F 11/327* (2013.01)

(58) Field of Classification Search
CPC ......... G06F 11/321–327; G06F 11/302; G06F 11/3075
USPC .................................. 717/105–113, 123–127
See application file for complete search history.

(56) References Cited

U.S. PATENT DOCUMENTS

| | | | | |
|---|---|---|---|---|
| 5,237,684 A * | 8/1993 | Record | ............... | G06F 11/3466 714/E11.2 |
| 5,732,277 A * | 3/1998 | Kodosky | ............. | G06F 3/04817 717/125 |
| 5,745,710 A * | 4/1998 | Clanton, III | ............... | G06F 3/00 725/60 |
| 5,867,659 A * | 2/1999 | Otteson | ............... | G06F 11/3466 709/224 |
| 5,893,083 A * | 4/1999 | Eshghi | ................... | G06N 5/043 706/45 |

(Continued)

OTHER PUBLICATIONS

Al'egroth et al, "Conceptualization and Evaluation of Component-based Testing Unified with Visual GUI Testing: an Empirical Study", IEEE, pp. 1-10 (Year: 2015).*

(Continued)

*Primary Examiner* — Anil Khatri
(74) *Attorney, Agent, or Firm* — Clayton, McKay & Bailey, PC

(57) ABSTRACT

Examples described herein include systems and methods for providing user flow insights on a graphical user interface ("GUI") for application process implementations across a network. The GUI can visualize successful and unsuccessful implementations of processes of an enterprise application. This can help administrative users more quickly identify issues with the application, which can report user flow information to a server. The GUI can present a first visual overlay comparing successful and unsuccessful user flows over specified time periods. Groups of successful and unsuccessful user flows can be displayed on top of one another for immediate relative visualization. Additionally, user flows can be grouped according to application processes and summarized in a second visual overlay. The second visual overlay can represent all user flows for an application process and be accompanied by a table of user flow entries, which may be expanded to reveal discrete events defining individual user flows.

20 Claims, 19 Drawing Sheets

(56) References Cited

U.S. PATENT DOCUMENTS

| | | | | |
|---|---|---|---|---|
| 6,574,791 B1* | 6/2003 | Gauthier | ................ | G06F 9/453 |
| | | | | 717/107 |
| 6,738,964 B1* | 5/2004 | Zink | ................ | G06F 30/30 |
| | | | | 717/105 |
| 6,973,649 B1* | 12/2005 | Pazel | ................ | G06F 8/34 |
| | | | | 715/763 |
| 7,376,935 B2* | 5/2008 | Bartz | ................ | G06F 8/20 |
| | | | | 717/101 |
| 7,788,647 B2* | 8/2010 | Martin | ................ | G06F 8/51 |
| | | | | 717/135 |
| 8,121,826 B1* | 2/2012 | Neely | ................ | G06F 30/34 |
| | | | | 703/14 |
| 8,352,397 B2* | 1/2013 | Rubin | ................ | G06N 20/00 |
| | | | | 706/45 |
| 8,531,451 B2* | 9/2013 | Mital | ................ | G06F 30/00 |
| | | | | 345/419 |
| 8,719,776 B2* | 5/2014 | Eteminan | ................ | G06F 8/20 |
| | | | | 717/113 |
| 8,738,414 B1* | 5/2014 | Nagar | ................ | G06Q 10/101 |
| | | | | 705/7.25 |
| 9,128,995 B1* | 9/2015 | Fletcher | ................ | H04L 43/04 |
| 9,785,412 B1* | 10/2017 | Huynh Van | ................ | G06F 8/24 |
| 9,887,889 B1* | 2/2018 | Dippenaar | ................ | H04L 43/0817 |
| 10,108,655 B2* | 10/2018 | Dubost | ................ | G06F 16/2358 |
| 10,114,949 B2* | 10/2018 | Sun | ................ | H04L 63/1425 |
| 10,397,013 B1* | 8/2019 | Hill | ................ | H04L 67/306 |
| 10,628,771 B1* | 4/2020 | Sicilia | ................ | G06Q 10/06393 |
| 10,761,813 B1* | 9/2020 | Echeverria | ................ | G06N 5/04 |
| 10,775,976 B1* | 9/2020 | Abdul-Jawad | ................ | G06F 16/9535 |

OTHER PUBLICATIONS

Ostrand et al, "A Visual Test Development Environment for GUI Systems", ACM, pp. 82-92 (Year: 1998).*

Xu et al, "Towards GUI Test Based on Interactive Event-Flow Model", IEEE, pp. 222-226 (Year: 2012).*

Boldi et al, "The Query-flow Graph: Model and Applications", ACM, pp. 609-617 (Year: 2008).*

Ammann et al, "Distributed Timestamp Generation in Planar Lattice Networks", ACM, pp. 205-225 (Year: 1993).*

Lu et al, "Development of an Improved GUI Automation Test System Based on Event-flow Graph", IEEE, 712-715 (Year: 2008).*

Arlt et al., "Behind the Scenes: An Approach to Incorporate Context in GUI Test Case Generation", IEEE, pp. 222-231 (Year: 2011).*

Peng et al, "Directing User Attention via Visual Flow on Web Designs", ACM, pp. 1-11 (Year: 2016).*

* cited by examiner

| APP VERSION | DEVICE MODEL | PLATFORM | SDK DEVICE ID | APP ID | UF START TIME | UF END TIME |
|---|---|---|---|---|---|---|
| 2.5.052(20... | LG WATCH... | ANDROID | 538f619e-2... | 84e3e1067ca2... | JUN 26, 2019 4:22... | JUN 26, 2019 5:22 A... |
| 7.1.1(3300... | SAMSUNG... | ANDROID | 538f619e-2... | 84e3e1067ca2... | JUN 26, 2019 4:22... | JUN 26, 2019 5:22 A... |
| 5.12 | HTC 10 | ANDROID | 538f619e-2... | 84e3e1067ca2... | JUN 26, 2019 4:22... | JUN 26, 2019 5:22 A... |
| 5.6.10-1419... | PIXEL | ANDROID | 538f619e-2... | 84e3e1067ca2... | JUN 26, 2019 4:22... | JUN 26, 2019 5:22 A... |
| 1.0.3 | MOTO X | ANDROID | 538f619e-2... | 84e3e1067ca2... | JUN 26, 2019 3:22... | JUN 26, 2019 4:22 A... |
| 0 | SAMSUNG... | ANDROID | 538f619e-2... | 84e3e1067ca2... | JUN 26, 2019 3:22... | JUN 26, 2019 4:22 A... |
| 7.1.1(3300... | HTC 10 | ANDROID | 538f619e-2... | 84e3e1067ca2... | JUN 26, 2019 3:22... | JUN 26, 2019 4:22 A... |
| 5.12 | SAMSUNG... | ANDROID | 538f619e-2... | 84e3e1067ca2... | JUN 26, 2019 3:22... | JUN 26, 2019 4:22 A... |
| 5.6.10-1419... | PIXEL C | ANDROID | 538f619e-2... | 84e3e1067ca2... | JUN 26, 2019 3:22... | JUN 26, 2019 4:22 A... |
| v1.17.67 | SAMSUNG... | ANDROID | 538f619e-2... | 84e3e1067ca2... | JUN 26, 2019 2:22... | JUN 26, 2019 3:22 A... |

*FIG. 6 (CONT. 2)*

VISUALIZING USER FLOW INSIGHTS ON A GRAPHICAL USER INTERFACE

BACKGROUND

Corporations are increasingly building their own corporate applications for specific enterprise-related purposes. Commonly, these applications can include different and independent processes, such as processes for logging in; scanning a barcode; adding an item to a cart; sending an email; or creating or sending a purchase order, for example. Each process can incorporate a series of events or sub-processes that are driven by, or otherwise responsive to, multiple user inputs. A user flow for an implementation of a given process includes a series of these events or sub-processes that are executed between a start and a successful or unsuccessful end state for that process implementation. Implementations of a given process may include the same start and one of three end states—a successful implementation, a user-defined failure, and an application crash. However, the exact series of intervening sub-processes or events may vary on a per user basis, as well as a per implementation basis with respect to a single user.

Often, a process can be implemented less than optimally or even fail due to errors that occur as part of user flows. The errors can delay process implementation, cause an implementation to fail, or even impact application security. Conversely, other events may be required for a user flow to ensure a successful end state while optimizing efficiency of a particular application process.

However, administrative users and corporate application developers have limited insight into user flows. Performance degradation or optimization associated with specific events in user flows may not actually cause an application to crash, or a process to be successful or unsuccessful. User flows can also be complex, resulting in context-dependent anomalies that are difficult to identify. As a result, performing root cause analysis ("RCA") for successful or unsuccessful process end states can be difficult.

User flow insight is also limited due to the variability of events that may be included in user flows for both successful and unsuccessful implementations of the same application process. Different users can select different options or use application options in different ways and accomplish or implement the same process. Sources of user flow information can be substantial in number since this information can be generated by many users across an enterprise. Another challenge stems from a level of granularity required of data to characterize user flow events.

Existing technologies do not easily visualize user flow data to engineers in a way that allows for actionable improvements. Unsuccessful processes and application crashes can be tracked or logged. However, a list of hundreds or thousands of such instances is not enough for a user to determine which of these instances includes a series of events (user flows) that was most responsible for successful or unsuccessful process implementations. Listing hundreds or thousands of these instances makes troubleshooting unwieldy and is also uneconomical from a computing power standpoint. Accordingly, the user is not able to identify events on a process level that lead to poor or optimal application performance.

Consequently, a need exists for systems and methods that utilize visual overlays for user flow insights, giving development teams enough diagnostics information to resolve application problems and identify optimal event combinations to improve application performance.

SUMMARY

Examples described herein include systems and methods for visualizing user flow insights for implementations of application processes on a graphical user interface ("GUI"). The GUI can allow an administrative user, such as an information technology ("IT") professional, to troubleshoot issues pertaining to an enterprise application. In particular, the GUI can help visualize process-related issues that the application may be having. Identifying such issues can help ensure that the application is not causing losses in workforce productivity or risking exposing sensitive enterprise data.

In one example, the GUI can receive a selection of user flows for an application. The term "selection" can apply to one or more different selections. The administrative user can select all or fewer than all of the processes of the application that include tracked user flows. These processes, such as sending an email, adding an item to cart, or facilitating an application or device login, can also define discrete internal network services specific to the application. With respect to a single process of an application, user flows for that process can define different versions of the process from an event by event execution standpoint.

In one example, the GUI can retrieve stored user flow information that meets a criterium corresponding to the selection. This can include requesting this information from a management server where event information for individual user flows may be centrally stored and organized according to the respective user flows the events define. The management server can provide a backend for an enterprise computing system and periodically receive and organize user flow event information for process implementations of multiple applications. The user flow event information may be received from various client devices that implement the processes in the course of executing one or more versions of the application.

In addition, the user flow information for individual user flow events from multiple client devices can be stored at the management server with other contextual information. Information associated with individual events within a given user flow can include: a process name; start and end timestamps; an application version; operating system ("OS") version; wireless carrier; device model; time period; network protocol; error type; software development kit ("SDK"); device identifier; user name; platform (e.g., ANDROID, IOS); and an end-state (should be one associated with the event). This can allow the GUI to selectively receive user flow information that meets the selection, effectively filtering what is received and displayed. Further, it can permit a user to compare how user flows including the same series of events are impacted by the operational conditions associated with the contextual information.

A management server can receive event information from a plurality of client devices implementing the same process of an application. An SDK running on each client device can transmit the event information, on a per event basis, to the management server. The management server may implement a service that determines an event status for each event. The event status can indicate whether that event was a start event, a post-start event, or an end event for a user flow (version of an application process). The event status may be determined based on an action type or operation preformed as part of the event, and a timestamp for the event.

In one example, a management server can compare timestamps and operations for a group of events in order to determine an event status for one more of the events in the group. In another example, the management server can compare timestamps and event statuses for events within groups of events to identify series of events that define discrete user flow. Further, the management server can determine whether the user flow resulted in a successful or unsuccessful process implementation based on an end state associated with an end event of the user flow. In one example, the management server can package event information into user flow information for a given process. The user flow information can be represented on a GUI in a visual overlay that compares successful user flows and unsuccessful user flows over corresponding periods specified by a user.

In another example, a GUI can display a first visual overlay that compares successful and unsuccessful user flows for implementations of different processes implemented by one application. This "all user flows" visual overlay can be pulled for multiple processes from multiple users that ran or attempted to run the same process of a given application. In yet another example, a second visual overlay can be displayed on a GUI based on a selection of a user flow summary for a specific one of the application processes represented in the all user flows first visual overlay. The second visual overlay can depict a comparison of successful and unsuccessful user follows for the selected application process in multiple formats such as a bar graph, overlapping bar graph, line graph, or a table format based on a user selection.

In still another example, a second visual overlay can be accompanied by a listing of user flows for a particular application process can be displayed on a GUI. Contextual information received by the management server can be included in the listing of user flows. In one example, the GUI may include functionality that allows a user to select and expand individual user flows within a pane including the listing, in order to view the events that define the selected user flow. Once expanded, timestamp, user activity, and action type information may be displayed for each event of an expanded user flow.

Both the foregoing general description and the following detailed description are exemplary and explanatory only and are not restrictive of the examples, as claimed.

DESCRIPTION OF THE EXAMPLES

Figure 1:
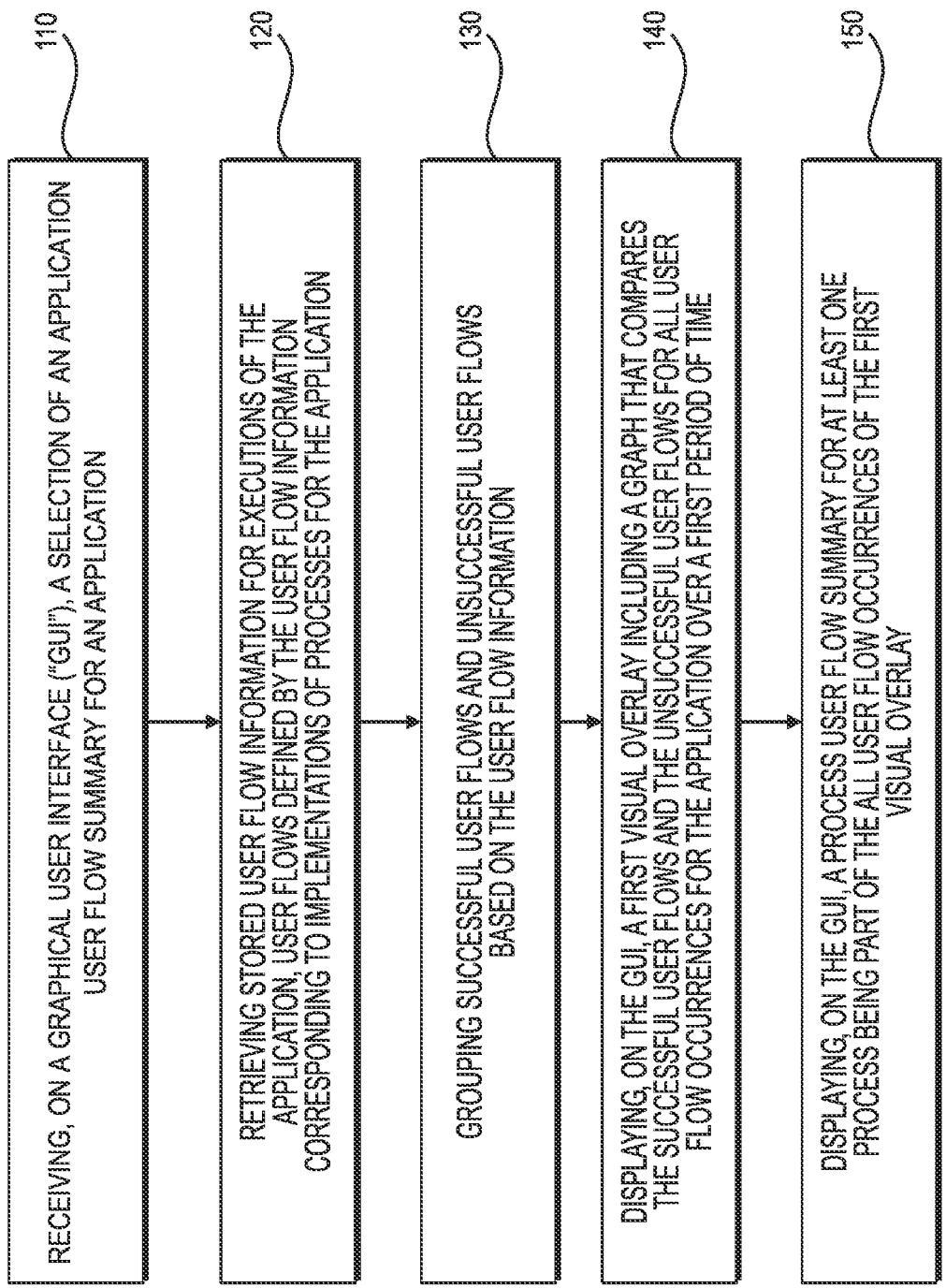
FIG. 1 is a flowchart for an example method for providing overlays for user flow insights.

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. Examples described herein include systems and methods for displaying overlays that provide network insights for application development and troubleshooting.

A GUI can be accessed by an administrative user to visualize various operational performance issues for certain applications based on data gathered during application usage. Applications can provide services that are used by members of an enterprise over a network. Each application can include one or more processes that can be broken into individual user input driven events that can be tracked. The user can select criteria to narrow down the information displayed on the GUI. For example, the user can select which application, as well as which process of a selected application, to examine. The selected criteria can also include a device type such as a phone or tablet, an operating platform such as ANDROID or IOS, an operating system ("OS"), and other enterprise specific filtering criterium such as user groups. The GUI can then retrieve stored user flow information meeting the selected criteria for application processes.

The GUI can display a first visual overlay that compares total successful and unsuccessful user flows for all occurrences of all processes for a selected application. An administrative user can customize the first visual overlay by modifying time periods, and specifying, among other things: an application version(s); OS version(s); device model(s); and user name(s). A first cycle can be, for example, the last few days. The first visual overlay can appear as an overlapping bar chart, overlapping area line graph, empty area line graph, or a table that visually represents the relative user flow success and failure for all application processes for a particular application.

Next to the first visual overlay, the GUI can include application process summaries for each process that contribute to the all occurrences first visual overlay. The process summaries can represent total successful and unsuccessful user flows for individual processes over a time period corresponding to a time period of the first visual overlay. The administrative user can select any of the process summaries to view a second visual overlay for more detailed information about successful and unsuccessful implementations (user flows) of a particular application process. The second visual overlay can include a breakdown of user flows grouped according end states over a common time period, each grouping being displayed in the same visual overlay in an overlapping format.

On the same GUI screen as the second visual overlay, the GUI can display a listing of user flows based on the retrieved user flow information. The listing can allow the user to make actionable observations about user flows with respect to end states, specific device types, users, operating systems, time periods, or operating platforms. In one example, the user flows can be grouped according to one of three ends states for application processes including success, crash, and user-defined failure. An entry for any user flow can be expanded from top to bottom to reveal discrete user input driven events of which that user flow is comprised. This can allow the GUI to display specific event information for each stage of a user flow, such as how long the event took, what user action was included, what operation was performed, a Wi-Fi connection operation and connection result, and a final end state of the user flow.

FIG. 1 includes example steps for graphically providing user flow insights that are helpful for application development. At stage 110, the GUI can receive a selection of an application user flow summary for a particular application. The selection can include multiple selections. For example, a drop-down list or menu of possible application versions can be presented, and the administrative user can select one or more of those application versions for examination. A separate drop-down list or other GUI element can allow the user to focus on certain time periods for examination.

The GUI can also provide other selections that are considered part of a selection of filtering criteria. For example, the GUI can allow the user to select particular application versions, OS versions, wireless carriers, and device models, and user names. As will be described, these selections can filter what user flow information that the GUI displays in one or more visual overlays.

At stage 120, based on the user selection of stage 110, the GUI can retrieve stored user flow information. In one example, the user flow information is stored at a server that is accessed by the GUI, such as a management server. The management server can periodically collect user flow information from user devices that execute the application, in an example. For example, the application can implement a software development kit ("SDK") that causes user flows to be captured for various processes of an application, and eventually reported to the management server or some other repository location. The user flow information can be captured for the purpose of providing insight into the application usage and performance. The format or exact types of information collected can vary between examples. In one example, the management server can collect codes that are part of user flow events that include user inputs, triggered operations, results of operations, error information, date and time, and identifying information about the user, user device, or operation. For example, the network request information can identify an application version, OS version, wireless carrier, and device model. These variables can all potentially impact network operation with the application.

At stage 130, the GUI can group user flows according to ultimate end state (successful or unsuccessful) of the user flow. Each user flow can correspond to an implementation of an application process. In one example, a process for an application can have a successful or unsuccessful end state. A successful end state can represent a full implementation of an application process, whereas an unsuccessful end state can indicate that the process was not completed and ended with a crash of the application or a user-defined failure. The GUI can group the user flows together for all user flow occurrences for all processes implemented for a particular application being executed by multiple users over a network.

In one example, the GUI can derive a statistical breakdown of the user flow occurrences based on the received user flow information. More specifically, the GUI can determine a total number of occurrences, and what percentages of those total user flows were successful and unsuccessful. The unsuccessful user flows can be further represented with percentages of the unsuccessful user flows involving application crashes and user-defined failures.

At stage 140, the GUI can display a first visual overlay section that compares the successful and unsuccessful user flows for process implementations for the application. The process implementations can be those characterized by the user flow information at stage 120. This can be some or all of the total processes, for example, based on filtering criteria selected by a user. The first visual overlay can depict the user flow occurrences for the application over a first period of time. The first visual overlay can include a graph that displays both successful and unsuccessful user flows over the first period of time for a selected one or more versions of the application. The GUI may also provide an administrative user with an option to specify or change which version(s) of the application selected in stage 110 to show user flow data for in the first visual overlay.

The comparison itself can be achieved visually using the visual overlay. The visual overlay can be represented as a chart where the compiled results of the two types of user flow end states are displayed. For example, the visual overlay can include a chart of overlapping line graphs—including a line graph for successful user flows and one for unsuccessful user flows. Each line graph can have a filled-in area below such that a color of an area under a line graph for successful user flows is a first color, whereas an area under a line graph for the unsuccessful user flows is a second color different than the first color, and areas of overlap are presented with a third color different than the first and second colors. In another example, the visual overlay can include, or be switched from the line graphs to include, bars for both end states (successful and unsuccessful) that are superimposed on top of one another.

The visual overlay can allow the user to filter user flow information presented in the first visual overlay according to a version of an application, an operating system, a device model, and/or a user name associated with respective user flows (successful and unsuccessful). This way, an administrative user can easily see if errors are increasing or decreasing for specific device types and models, operating systems, users, application versions, or combinations of these filtering options.

In another example, the GUI can provide a user with an option to display a historical comparative analysis of user flows over separate time periods. For example, the user flows of today can be compared against the errors of a month ago. The GUI can provide a selection element for picking the past cycle in an example, allowing for selecting a time period to which the comparison should be made.

At stage 150, the GUI can display a process user flow summary for at least one application process making up a part of the user flow occurrences represented in the first visual overlay. In one example, the process user flow summary can display a total number of user flows, successful and unsuccessful, for a respective process over a time period corresponding to a time period of the first visual overlay.

In another example, the process user flow summary can include a graphic that is divided into first and second portions that corresponding to successful and unsuccessful user flows respectively. The first and second portions of the graphic can be sized in proportion to a number (percentage) of the total user flow occurrences that constitute successful user flows and unsuccessful user flows. In yet another example, the process user flow summary can include averages of certain tracked metrics for the user flows. For example, the process flow summary may include an average time of implementation for the user flows (successful and unsuccessful) presented by the process user flow summary.

The process user flow summary can include an option that can be selected by a user to access more detailed information about the implementations for the process summarized. A selection of a detailed view option for the process user flow summary can cause the GUI to generate a second visual overlay that compares successful and unsuccessful user flows for a process summarized by the process user flow summary.

Figure 2:
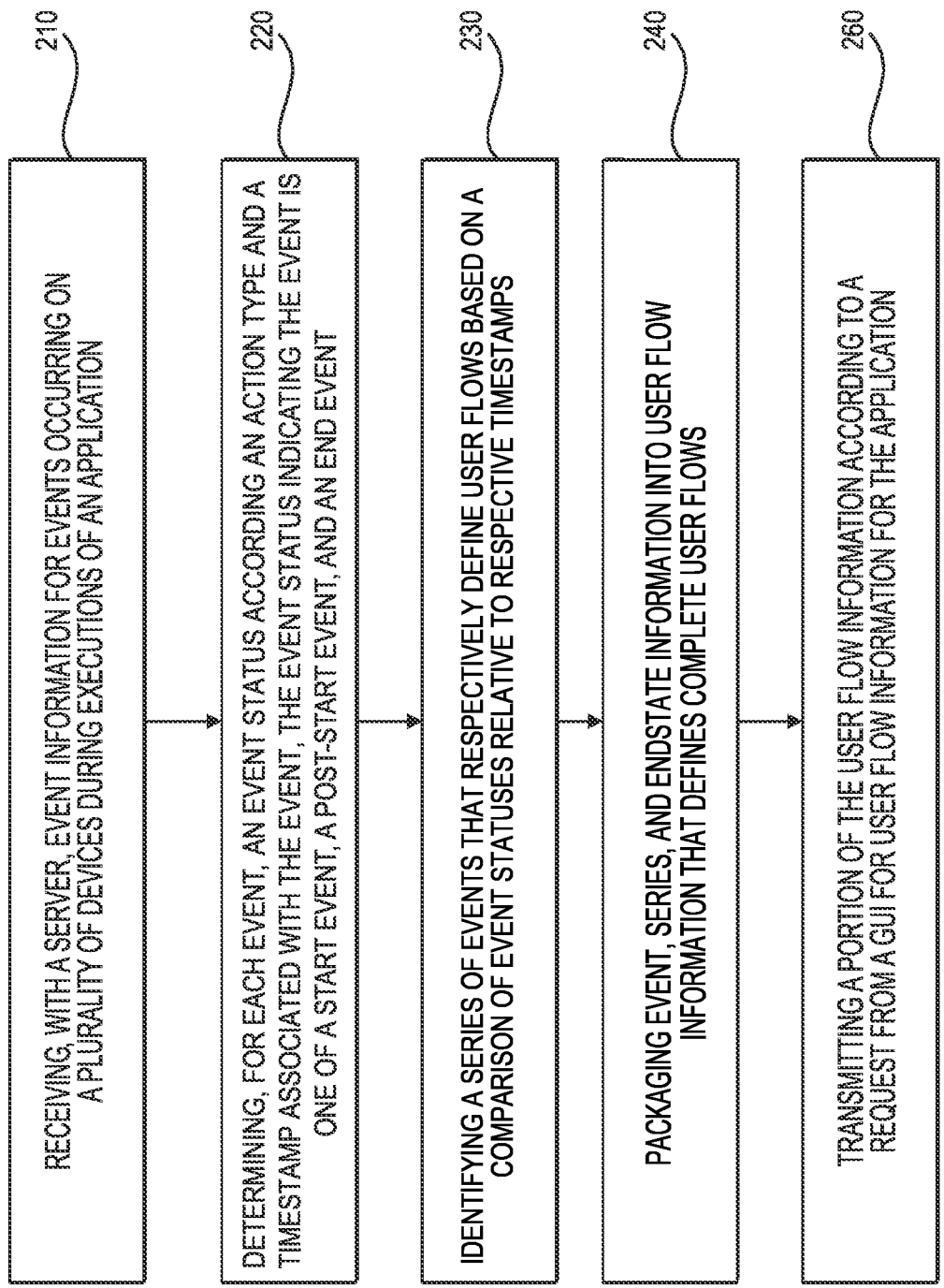
FIG. 2 is a flowchart for an example method for creating an event summary from a series of events that together define a user flow for an event.

FIG. 2 is another method of example stages related to the user flow and process user flow summaries. For the purposes of the present disclosure, a user flow includes a series of events that are performed or otherwise occur as part of an implementation of an application process. A group of events can be user input driven, and together as a series, define a user flow for a particular implementation of an application process. Since the events are user input driven, an event type, operation performed by or during an event, and a user input requested or deemed acceptable for an event, may be dependent on these same aspects for a preceding event. As a result, one or more application processes may be accomplished or otherwise implemented with different combinations (series) of different events.

At stage 210, a management server can receive information regarding events performed or occurring on a plurality of devices as the devices execute applications for an enterprise. In one example, the server can poll SDKs operating on devices within a network, and the SDKs can send event information for each event that occurs during the execution of one or more applications specified by the server. In another example, the SDKs can be configured to broadcast event information as soon as each SDK receives the event information from an application for which the events are occurring.

At stage 220, the management server can determine an event status for each event characterized by the event information received in stage 210. The determined event status can indicate whether the event was one of a start event, a post-start/pre-end event, or an end event of an implementation of an application process (a user flow).

In one example, the management server can parse the event information for a single event and identify a type of action or operation associated with or otherwise performed as a part of the event in question. In addition, the management server can recognize and store a timestamp or timestamps associated with the event. The action type and timestamps can be used by the management server to determine an event status associated with the event.

At stage 230, the management server can identify one or more series of processed events that respectively define user flows for an application process. In one example, event statuses and time stamps for groups of events can reviewed in order to identify those events that temporally fall between start and end events. To ensure that events occurring on one device are not combined into a series of event occurring on another device, the management server can access event information associated with each event, which can include the source (device) of the event information.

At stage 240, with the user flows identified, the management server can determine whether each user flow was successful or unsuccessful according to an end state associated with an end event of each user flow. Each user flow represents or defines a discrete implementation of a process for an application. The management server can review a primary function or objective for the process associated with each user flow to determine a respective end state.

For example, a process for an application can provide the primary function of placing an item into an online shopping cart and progressing to a checkout stage. During one implementation of this process, a user may place the item in the cart, but fail to progress to a checkout stage due to the user performing a required user action after a predetermined period of time has elapsed. The end event of the process being a system timeout and removal of the selected item from the shopping cart. Information characterizing each of these events can be provided to the management server, which groups the events into a user flow. The management server can recognize the removal of the item from the cart due to the timeout as an end event of the user flow (process implementation). As part of stage 240, in this example, the management server can determine the user flow was unsuccessful since the primary function of progressing to a checkout stage did not occur.

The above example can also be used to illustrate the different types of unsuccessful user flows that can occur, be identified, and categorized by the management server. In the above example, the user flow was unsuccessful for the purposes of the primary objective of the associated process due to the inaction of the user. As a result, the management server could sub-categorize the unsuccessful end state of the user flow as "user defined." On the other hand, another implementation of the process in question could have ended by the application crashing due to numerous reasons that could be application, OS, or device related. In this alternate situation, the management server could sub-categorize this unsuccessful end state of the respective user flow as "crash."

At stage 250, the management server can package the event, series, and end state information into user flow information that defines discrete user flows that correspond to respective implementations of an application process. In one example, the user flow information can define user flows carried out on multiple devices across an enterprise. For any one defined user flow, corresponding user flow information can include each event that occurred as a part of that user flow. Accordingly, the action or operation and timestamp information associated with an event, as well as an event status (as well as an end state if applicable) determined for the event, can be included in the user flow information for a user flow including the event.

In one example, the management server can store the user flow information in stage 250. In another example, the management server can continuously update stored user flow information according to event information being received from SDKs implemented on devices connected to the server through a network. In another example, the management server can continuously review a time of a last update of user flow information for one or more applications, or even particular processes of applications. The management server can use the time of the last update as an indicator that a predetermined period of time has elapsed without a new update and thereby trigger the management server to poll devices for new event information for a particular application or specific application process.

At stage 260, the management server can respond to a request from an administrative user device ("admin device")

made through a GUI. The management server can transmit a portion of the user flow information for an application requested by a user through the admin device. In one example, the server can send user flow information for an application in total to the admin device. Accordingly, the GUI may be responsible for filtering and sort the transmitted user flow information pursuant to various selections made by the user. In another example, the server can filter the data to be sent according to filtering options selected by the user through the GUI.

Figure 3A:
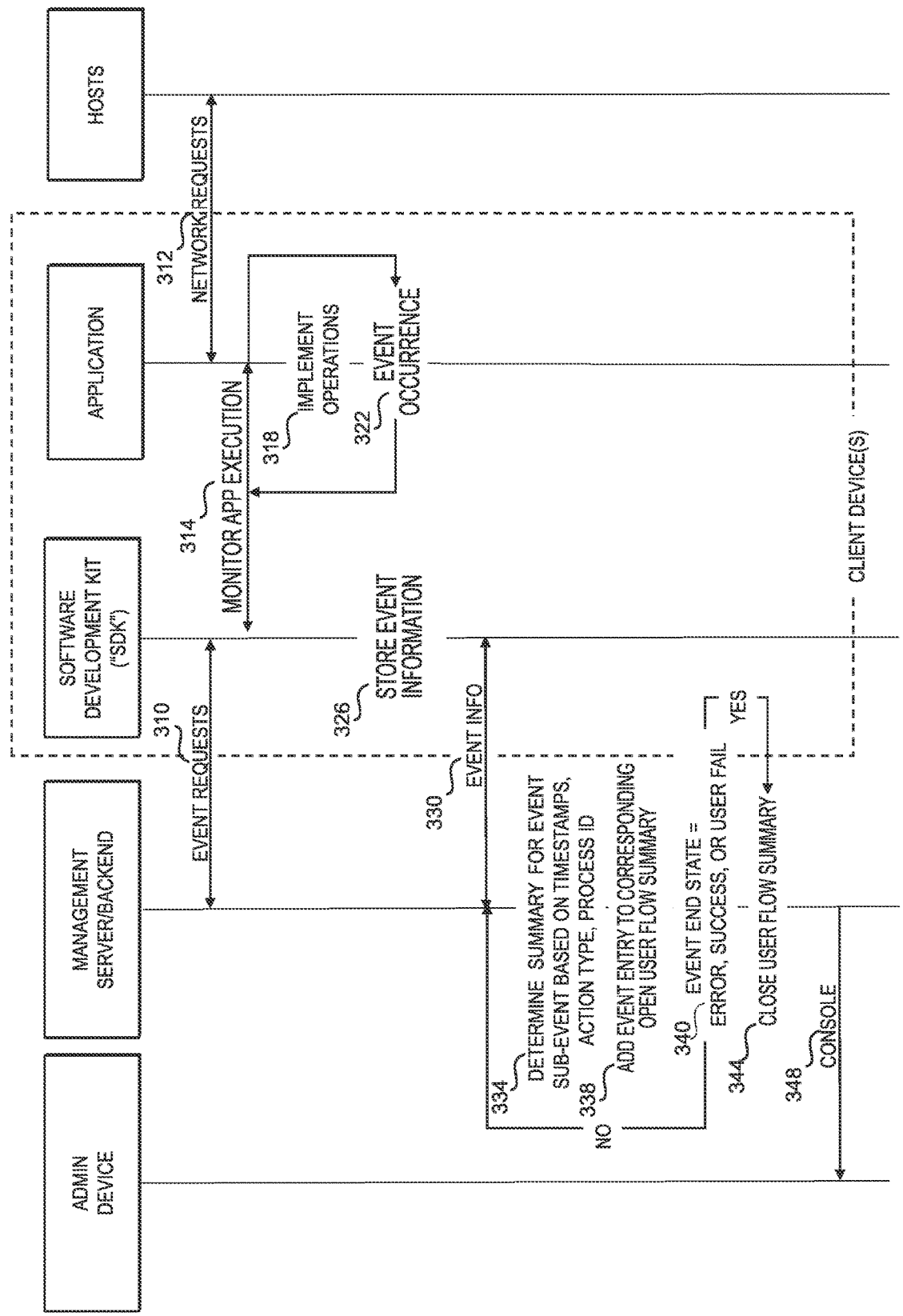
FIG. 3A is an example sequence diagram with stages for determining what events to include in user flow summaries and creating the user flow summaries.

FIG. 3A is an example sequence diagram with stages for determining what events to include in user flow summaries and creating the user flow summaries. At stage 310, a management server can request event information from one or more SDKs operating on respective client devices. The management server can specify source and content with respect to event information it receives. For example, the server can specify and receive event information about a group of applications, a single application, a group of processes for one or more applications, or a single process for a select application.

In one example, an application being tracked may implement the SDK that provides event information to a management server. The SDK for the application can allow the application to make and receive function calls that the management server can recognize and vice versa. Accordingly, the SDK can define the functions for which calls are made, and the application can implement the SDK to include those functions. When certain events occur in the application, the SDK can report that to the management server in real time or in bulk at a later point in time.

In another example, an SDK that reports events regarding a first application to the management server can be implemented by a second application, such as an agent application that is installed on the client device. In this example, the second application could monitor the first application functions and events and report those to the management server.

In one example, stage 310 can include the SDKs transmitting information in real-time without receiving a request, or according to a protocol previously sent from the management server. In still another example, stage 310 can include the SDKs sending the management server notifications indicating new event information is available, and the management server responding with an instruction to transmit or hold the information. In one example, the management server can instruct the SDKs to postpone transmission during situations where computing resources for the management server have been prioritized with respect to other operations.

At stage 312, an application(s) on a client device can transmit requests to various hosts in a network as part of a respective execution of the application. The application can make network requests to any number of hosts. The reasons for these network requests can be myriad. For example, the application may need to retrieve data, validate an identity, access a repository, or even execute a portion of code that is remotely located. As these network requests are made, the application can track aspects of the network requests and store those as event information. However, in one example, the application may only store some portions of the network requests made at stage 312 that are relevant user flow information. Applications generating events that can be grouped into user flows for tracking purposes can incorporate events or entire processes that rely on network requests of some type. However, applications which do incorporate network requests during execution are not excluded from application of the systems and methods described herein.

At stage 314, the SDK can monitor the executions of the application for event occurrences. In one example, the SDK can include a list of event types which the SDK considers events for the purposes of reporting event information to the management server. The management server can periodically update or change the list that the SDK references for application operation monitoring.

In one example, the SDK monitors the operations performed by the application as the application executes. The monitoring can be implemented by the application SDK or some other agent that monitors the application. In either case, the SDK can identify an event—either when it occurs or afterwards. In another example, the SDK can instruct the application to advise the SDK when any of the events specified in a list of events occurs. Further, the SDK can cause the application to transmit information characterizing aspects of the event (e.g., operation performed, user input, timestamps) along with the event occurrence notification.

At stage 318, the application can run various processes as part of executing the application. This stage can include one or more user input driven events that are continuously reported or detected in stage 322. The event reporting can continue until the processes complete execution. In one example, events for one application process may not occur consecutively. In fact, some events for one application process can be chronologically mixed along a timeline over which events for another application process occur.

As a result of the continuous monitoring by the SDK or reporting by the application in stage 314, the SDK can receive event information about events in real time or shortly thereafter as part of stage 314. At stage 326, the SDK can store some or all aspects of the event information obtained as a result of the monitoring and reporting operations occurring as part of stage 314. In one example, the SDK can store an SDK identifier with the event information at stage 326.

At stage 330, the SDK can send the event information including the SDK identifier to the management server. In one example, stage 330 can include the management server issuing a call to the SDK(s) in order to obtain new event information. In another example, one or more of the SDKs can initiate a transmittance of event information based on one or more parameters. For example, the SDK can follow a rule specified by the SDK or the management server concerning a maximum or minimum number of events that must occur before event information is transmitted to the management server. In another example, stage 330 can include the SDK sending the management server a notification regarding new event information being available. In turn, the management server can respond with an instruction to send or hold the new event information in stage 330.

At stage 334, the management server can organize the event information and parse out data elements corresponding to timestamps, action or operation types, and process identifiers. The management server can do this for any number of events that are characterized or otherwise described by the received event information. Additional information that may be included with the event information and processed in stage 334 can include a user name, device ID, device type, platform, and application version identifier. All of this information can be used to build an event summary for each event provided for by the event information obtained in stage 330.

In one example, an event summary can include the timestamps, action type, process identifier as well as a status of the event as one of a start event, a post-start event, or an end event. In some examples, the event information may describe the event in such a manner that little analysis by the management server is needed. This may be the case for start events. However, all events described in the event information could potentially have any of the three statuses even where some aspect of application execution starts or terminates as part of the event in question.

For example, a process may include successfully connecting to a Wi-Fi network. However, this may constitute an intermediate event where a full implementation of the process includes obtaining a one-time connection in order to transmit a single message during the limited period when the connection is active. Accordingly, in one example, to determine an event status for any one event, the management server may consider the operations or action types, and any determine event statuses of other events, described in the event information provided in stage 330.

Prior to determining an event status of an event based on another event, the management server can ensure that several aspects of the events being compared match. For example, the management server may look at the application version, user, device, and process information detailed in the event information for both events to ensure the events are part of the same user flow. In addition, timestamps of the events will also be considered by the management server.

While large time gaps can occur between events of the same user flow, the existence of time gap can also indicate to the management server that two events are not part of the same implementation of a process (user flow). For example, the management server may recognize that an action of operation of a second event could result from or otherwise follow an action or operation of a second event. However, in reviewing the timestamps of each, the management server can be configured to recognize a time gap between the events and compare that time gap to rules of operation attendant to the operations of one or both of the first and second events to determine if they occurred as part of the same user flow.

In one example, the management server can recognize a timeout after the first event, ending the process before the time that elapsed between the first and second events. Likewise, the management server could recognize that at least one event must occur within a certain time period before a timestamp of the second event, for the operation of the second event to either be performed or available for performance. In such a situation, the management server can look to the event information received in stage 330 to determine if there any other events described that could be an intervening event. This can allow the management server to determine if all three events could be part of the user flow for an application process. Where there is no intervening event, the management server may look to other information to determine the event status of the second event.

At stage 338, the management server, having determined an event status of an event, can assign the event to an open user flow summary. Further, an entry including event information for the newly assigned event can be added to the open user flow summary. Similar to the process for determining an event status, the management server can compare event information as well as event statuses of an event in question with the same information for events that have been assigned to different user flow summaries. In one example, the addition of an event to a user flow summary can heavily depend on a recognition that a process for an event and that of a user flow summary are the same, and the timestamps in a case were the process is normally implemented with event occurring successive with small gaps of time therebetween.

At stage 340, the management server can determine whether an event status indicates an event is an end event. In situations where this is the case, the management server can determine an end state to assign to the event in stage 340 and close a corresponding user flow summary in stage 344. In a case where the event being processed is not an end event, the management server can repeat stages 334 to 340.

At stage 348, the management server can send packaged user flow information to an admin device for display. In one example, the management server provides a console to administrative users at stage 348. The console can include a GUI for user flow insights regarding one or more applications. An administrative user can access the console using a user device, such as a phone, tablet, laptop, or computer. The GUI can be web-based in an example, providing remote access. Alternatively, it can be part of a local program on the user device. The console can provide options regarding which event information for the management server to collect from an SDK, or for the SDK to collect from an application, in some examples. This can impact which information gets reported at stage 314, stored in stage 326, and or transmitted in stage 330.

Figure 3B:
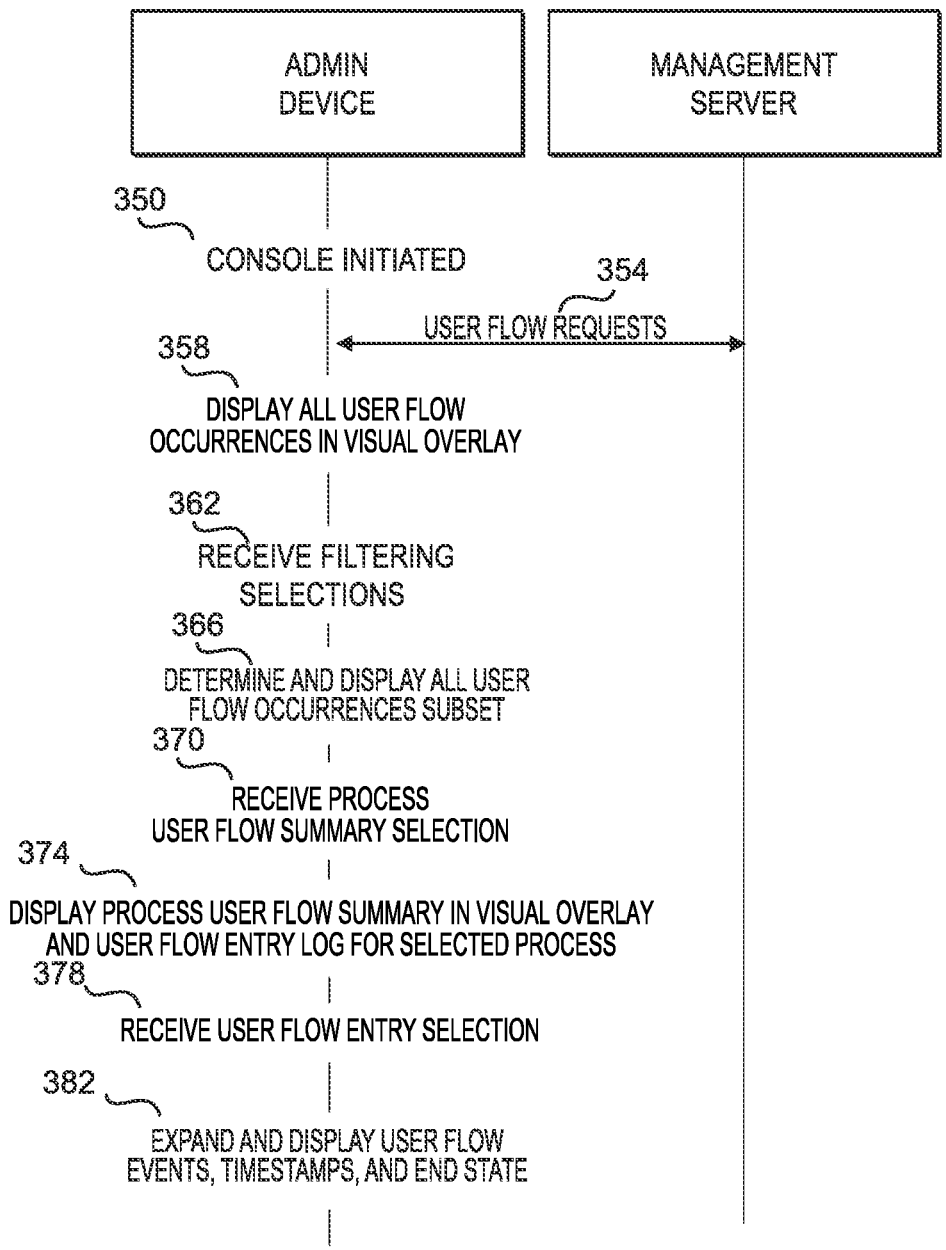
FIG. 3B is an example sequence diagram with stages for accessing and displaying different aspects of user flows in overlays to provide specific user flow insights.

FIG. 3B is an example sequence diagram with stages for accessing and displaying different aspects of user flows in overlays to provide specific user flow insights.

At stage 350, the console can be initiated and displayed on the admin device. In one example, the console can be initiated in response to a user selecting an option to display user flows provided in a home screen for summarizing application performance. In another example, the home screen can display performance summaries for multiple applications, and the option selected in stage 350 for initiating the console can be specific to one of the applications.

At stage 354, the admin device can poll the management server for the most recent user flows based on the initiation of the user flow console. In the event new user flows are available, these new user flows can be provided to the admin device and integrated statistically with the other user flows previously obtained in stage 348. In particular, the GUI or an agent on the admin device can review the end states of any new obtained user flows and associated processes and update the successful and unsuccessful user flow statistics for those processes.

At stage 358, a first visual overlay can be displayed on the admin device and represent user flow occurrences for some or all tracked processes of the application selected in stage 350. As will be described in more detail with respect to FIGS. 4, 5A, and 5B, the first visual overlay display chart, graph, or table that separately summarizes a total number of successful and unsuccessful user flows for tracked processes of an application over a selected period of time. In addition, adjacent to the first visual overlay there can be provided one more process user flow summaries that give a breakdown of a number of successful and unsuccessful user flows for one of the processes which contribute to the data presented in the first visual overlay. In one example, any of these summaries can be selected by an administrative user to access a second visual overlay that provides more detail with respect to the user flows of the selected process.

At stage 362, with the first visual overlay being displayed, the admin device can receive filtering selections from a user. In one example, the user can specify a version of an application that was selected in stage 350. In another example, a user can enter selections that specify one or more device models, one or more operating systems or OS versions, and one or more users or groups of users. In addition, the user can change a time period for evaluation. In this way, the user can make control which information gets displayed. This can narrow down what user flow information is used to visualize the results on the GUI for the application selected in stage 350.

Based on the filtering selections of stage 362, the GUI can dynamically display a new version of the first visual overlay that represents a subset of the data that was originally represented by the first visual overlay in stage 358. The new version of the first visual overlay can include a chart that visually compares successful and unsuccessful user flows for the selected application according to the selected filtering option, and the process user flow summaries can be updated as well. In one example, the GUI can provide options for selecting historical user flow data for comparison with the current subset of data being represented by the first visual overlay. The comparison itself can be visually represented by superimposing respective user flow graphs for successful and unsuccessful user flows on top of one another. This can reveal significant changes in errors and success between cycles of application executions, letting the user gauge, for example, how a recent update to the application impacted user flows.

At stage 370, a selection of one of the process user flow summaries can be received by the admin device. As previously mentioned, the process user flow summaries can give a breakdown of a total number of each of the successful and unsuccessful user flows for a particular application process according to the same filtering criterium that is applied to the first visual overlay. The process user flow summary could be selected should the administrative user desire more detailed information regarding when user flows occurred, or events that defined any one of the user flows.

At stage 374, a second visual overlay corresponding to a selected process user flow summary can be displayed on the admin device. As explained in more detail with reference to FIGS. 6-11, the second visual overlay can be accompanied by a log of entries. Each entry represents a specific one of the user flows collectively represented in the second visual overlay. In one example, the log can include several columns, each representing a category of data that is tracked or otherwise determined and recorded for a user flow. In one example, a user flow end state defines a data category for one of the columns and allows a user to quickly see when user flows were successful, ended with a user-defined failure, or resulted in an application crash. In another example, the entries in the log can be sorted according to any of the data categories of the displayed columns.

At stage 378, the console can receive a user selection of one of the entries displayed in the table. As a result, the selected entry can be expanded in stage 382 to reveal a listing of events that define the selected user flow. In one example, each event can be characterized in the listing with a description of that event and a timestamp for when the event occurred. As will be discussed in more detail with reference to FIGS. 7A-7C, the expanded listing can include text displays above and below the listing of the events which respectively include start and end times of the expanded user flow entry. Clicking an event can reveal additional information collected as part of the event.

This can effectively allow a user to start with a high-level summary of user flows, expand the corresponding user flows, and expand one of those user flows into individual events. This can allow a user to more easily identify which events led to successes or failures between similar user flows.

By visualizing different user flows on an event by event basis, the user can get a sense of how different events have caused user flows to be successful or unsuccessful.

Figure 4:
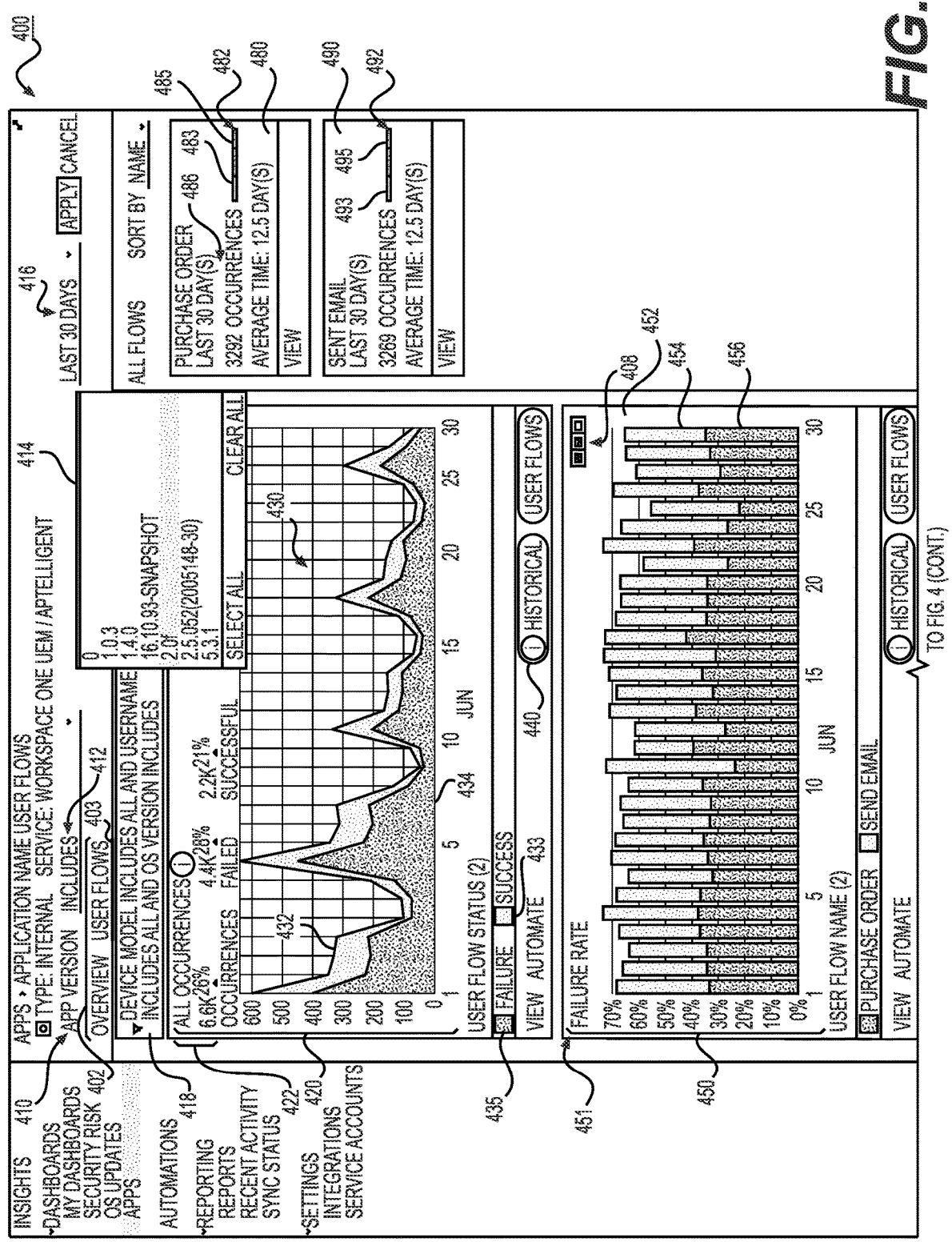
FIG. 4 is an example illustration of a GUI for providing, with visual overlays, user flow insights for successful and unsuccessful user flows.
Figure 4:
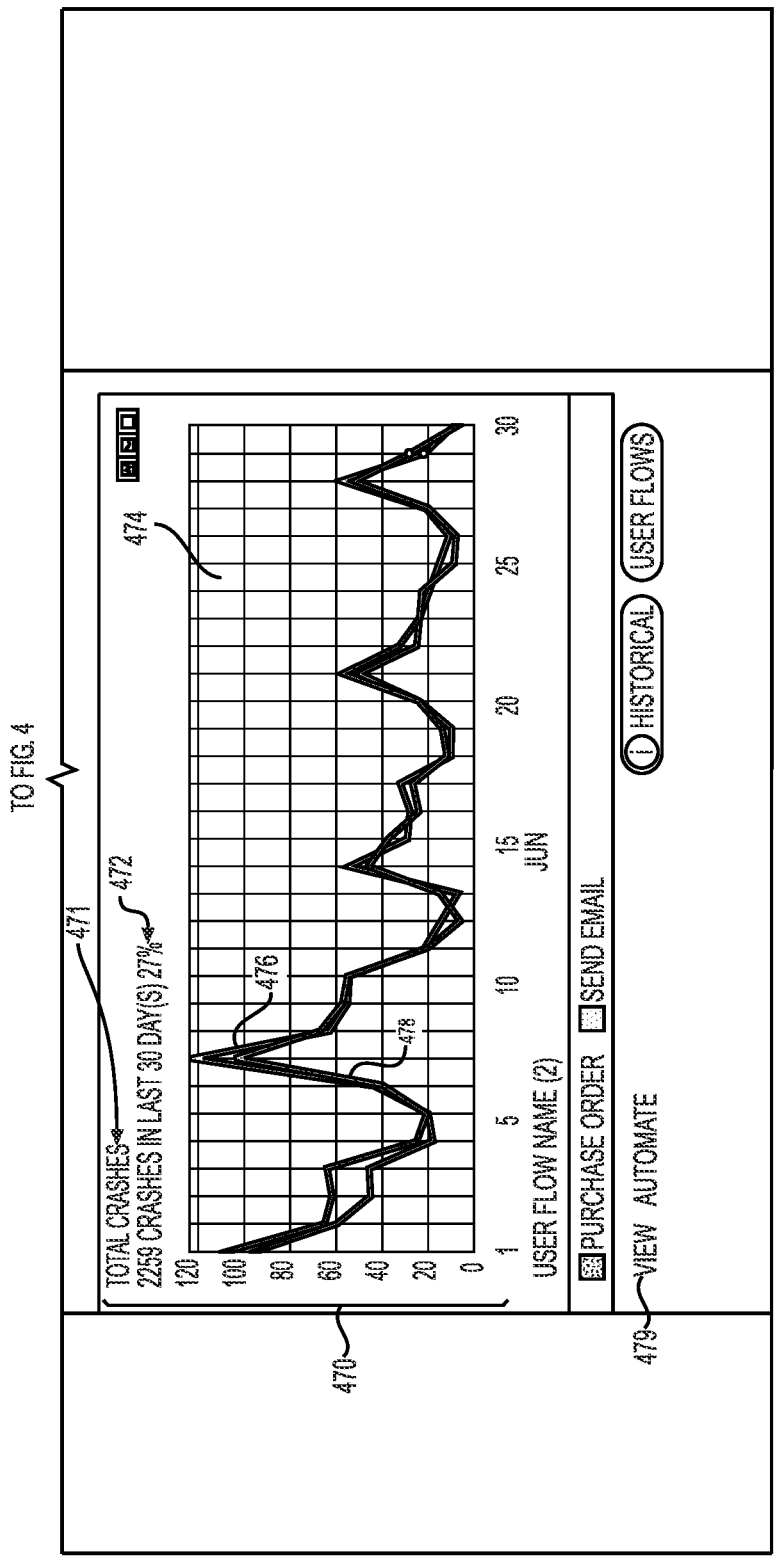

FIG. 4 is an example illustration of a GUI for providing user flow insights. In this example, a first screen 400 is displayed based on a user flows option 403 selection. Other selections such as an overview selection 402 and a crashes selection (not shown) can provide different details. For user flow insights, the GUI can present an all occurrences visual overlay 420 ("first overly 420"), a user flow failure rate overlay 450, as well as a total crashes overlay 470 (see FIG. 4 Cont.) on the same first screen 400. Each of the overlays 430, 450, 470 can include a formatting selection option 408 can be used to select a particular type of chart, such as an overlapping bar chart, line graph, or table, to be used to present the user flow insights.

All of these overlays can be based on user flow information that is filtered according to a selection by the user, which can include multiple selections on the GUI first screen 400. In this example, a first global filter 410 can be configured by a user to specify one or more particular application versions for evaluation. In particular, a user can choose an operator such as "includes," "excludes," or "matches" with a first operator selector 412, and a text option for an application version index or name with a first dropdown box 414. In addition, a user may specify a time period with a global time range option 416.

A search summary 418 can be displayed above a first pane that includes the first visual overlay 420. The search summary can include a string that specifies the filters that are currently being implemented to produce the content of first screen 400 as illustrated in FIG. 4.

The first visual overlay can include a global statistical summary 422, a chart 430, and a legend that indicates what graphical elements in the chart 430 represent successful and unsuccessful user flows. The global statistical summary 422 can display a total of how many user flow occurrences are represented in the chart, and how many of those user flows were successful and unsuccessful. In addition, the percentages displayed in the first visual overlay can indicate what proportion of all user flow occurrences for all versions of the application are being represented in the chart 430. More specifically, in the case of FIG. 4, the total number of occurrences (6.6K) represented for the application version previously selected is equal to 25% of all of the user flow occurrences for all versions of the selected application. Likewise, the percentages provided next to numbers for the failed and successful user flows indicate what proportion of all unsuccessful and successful user flows for all versions of the application, are represented in the chart.

In addition, the first overlay can include a historical comparison option 440. If the historical comparison option 440 is selected, the GUI can present a pop-up screen that allows a user to enter at least two different time ranges. Upon selection of the time ranges, the first visual overlay can display successful and unsuccessful user flow totals for both ranges. The ranges can be equal in length so they can start and end at the same locations along an X-axis.

In the first visual overlay 420 of FIG. 4, successful user flows are represented by a first line graph 432. The first line graph 432 can be produced for a selection of all application versions (as a default) or based on filtering criteria. Data from the last 30 days (per time selection option 416). An area below a respective line of the first line graph 432 is filled with a first color. At the same time, the unsuccessful user flows over the same time period for all or filtered application versions are represented by second line graph 434, which can be filled with a second color that is different than the first color. In this way, a user can quickly compare and determine if application processes are being implemented successfully as a whole, more often than when they are implemented unsuccessfully.

A first legend object 433 indicates that the first line graph 432 corresponds to successful user flows, while a second legend object 435 indicates that the second line graph 434 corresponds to unsuccessful user flows. In one example, either of the first or second legend objects 433, 435 can be selected such that chart 430 only displays the line graph corresponding to the selected legend object.

Turning to the failure rate and total crashes visual overlays 450, 470, these overlays represent breakdowns of user flow information with respect to particular application processes. Thus, they present subsets of the data represented in first overlay 430. More specifically, the failure rate overlay 450 includes a bar chart 452 with first bars 454 that represent a failure rate for a send email application process. Second bars 456 represent a failure rate for a purchase order application process for the application summarized by the first screen 400. The bars 454, 456 represent percentages of total user flows for their respective application processes, that resulted in application crashes or user defined failures over an increment (e.g., a day) of a total amount of time (e.g., 30 days) presented in the bar chart 452.

The bars for the application processes represent percentages of total user flows that resulted in an The total crashes visual overlay 470 includes a total crash summary 472 and a chart 474 that includes line graphs for one or more application processes. In the case of FIG. 4 cont., first and second line graphs 476, 478 depict application crashes occurring respectively as part of send email and purchase order application process user flows over a 30-day period in June. Thus, the total crashes visual overlay 470 represents a subset of data relative to the failure rate overlay 450, which covers crashes and user-defined failures over the same period. In this example, the total crashes visual overlay 470 includes a view control option 479 that can be selected by a user to obtain more detailed information regarding the crashes depicted in the chart 474, as described in more detail with reference to FIGS. 10 and 11.

Referring back to FIG. 4, the first screen 400 also includes a first process user flow summary 480 for a purchase order application process, and a second process user flow summary 490 for a send email application process. The first process user summary 480, in this example, includes a comparison bar graphic 482 and high-level summary 486. The comparison bar graphic 482 is broken into two sections, a first section 483 representing, and sized according to, a proportion of user flows for the purchase order process that were successful. On the other hand, a second section 485 representing, and sized according to, a proportion of user flows for the purchase order process that were unsuccessful. The high-level summary 486 conveys the time period for evaluation, a total number of user flow occurrences for the purchase order process over the time period, and an average time for the user flow occurrences included in the total.

Figure 5A:
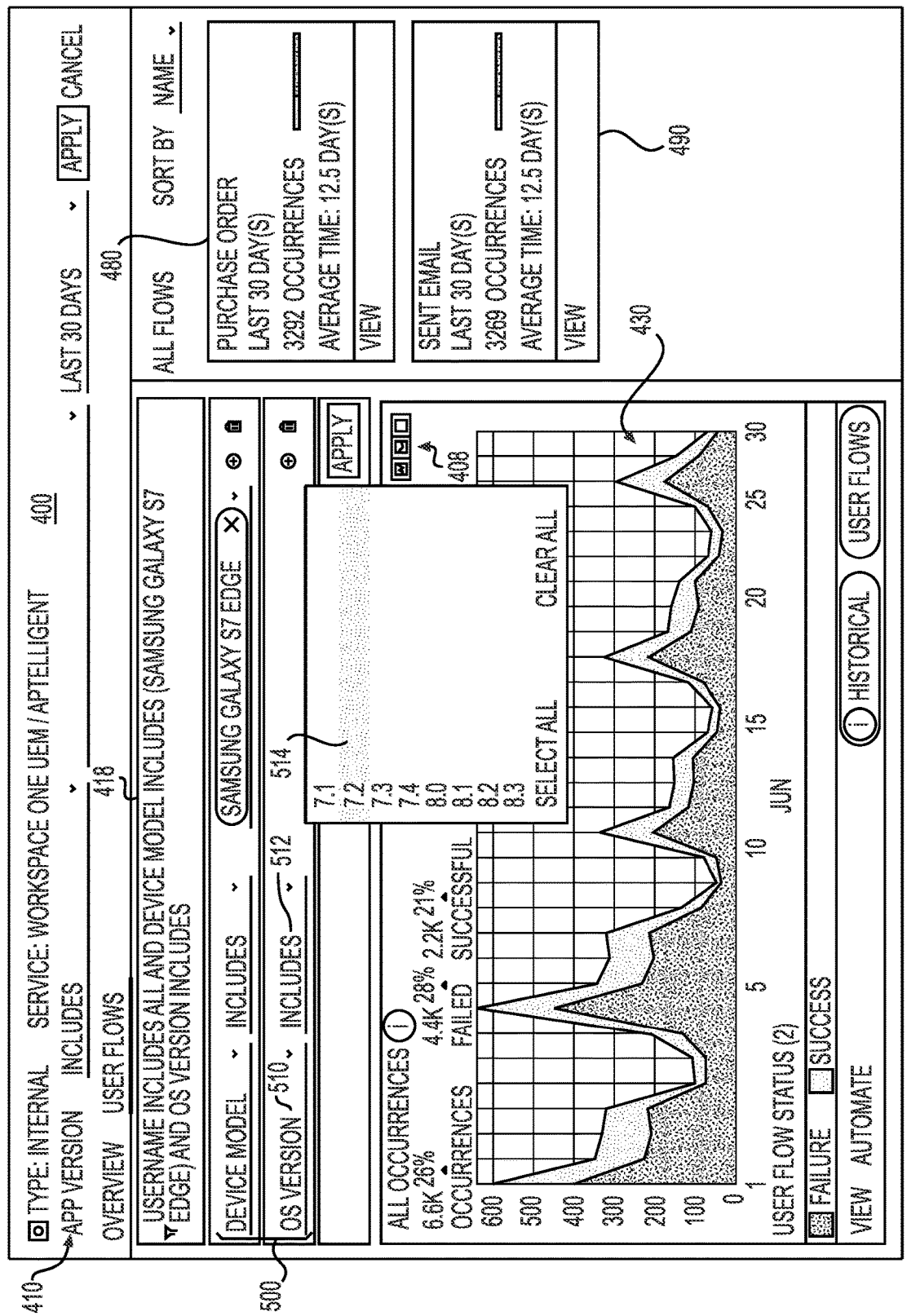
FIGS. 5A and 5B are example illustrations of a GUI that includes multiple options for specifying filtering criteria to generate a visual overlay that provides user flow insights.
Figure 5B:
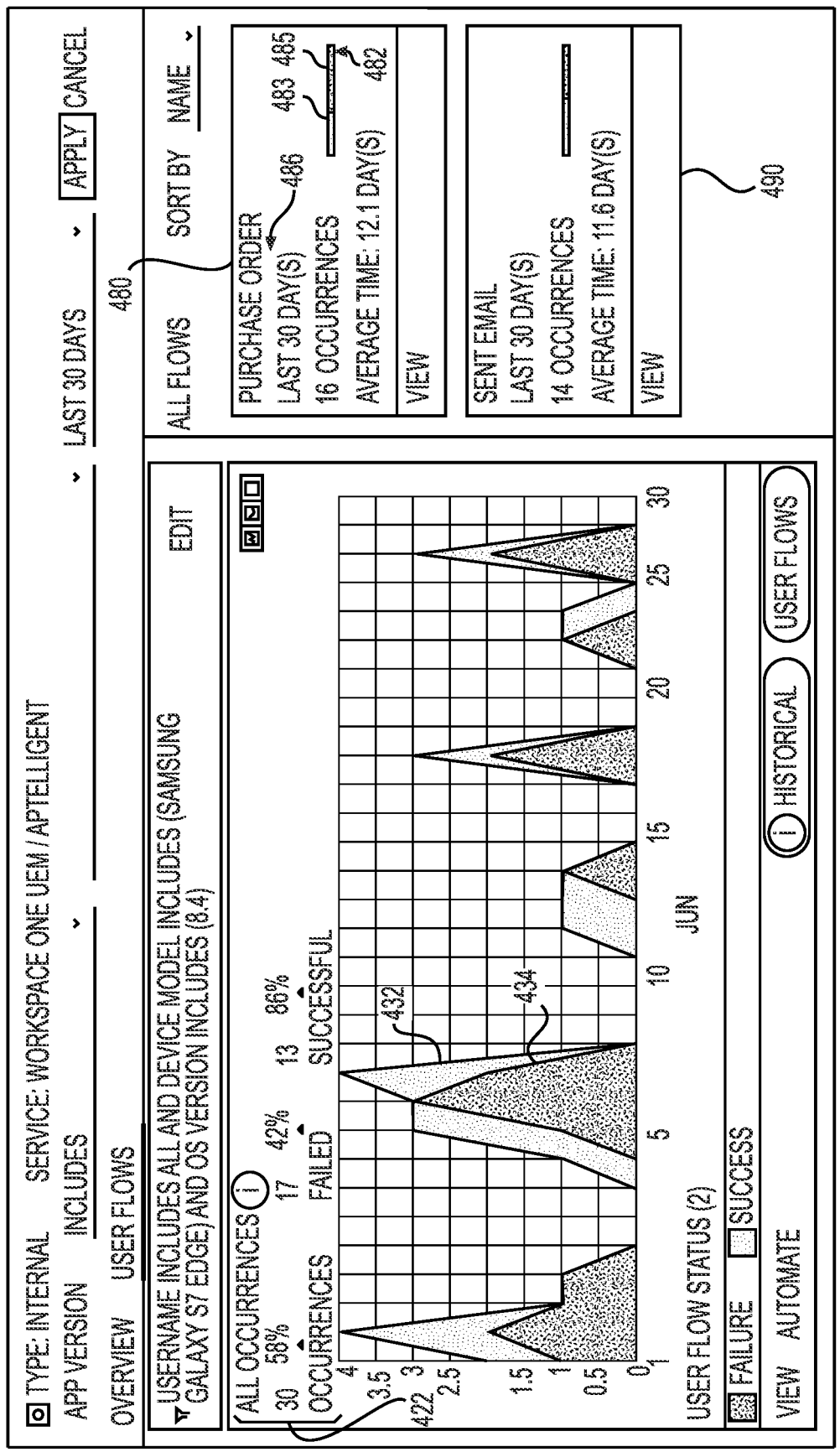

FIGS. 5A and 5B are example before and after illustrations of the GUI in which multiple options for specifying filtering criteria are implemented to generate a version of the first visual overlay 420 that provides user flow insights. In particular, FIG. 5A illustrates a global secondary filter module 500 that can allow the user to further tailor a visualization of the first overlay 450. Example secondary filters 510 can include device type, OS version, and user name or user group. In one example, an operator 512 can be used with a drop-down list 514 that include selectable options corresponding to the secondary filters 510 as illustrated in FIG. 5A.

In another example, a user can narrow down user flow visualization content based on particular metrics, such as unsuccessful user flow type or event type. This can help eliminate noise that the user is not interested in examining. The user can also set data in and data out thresholds to examine user flows that involve the transfer or usage of data of varying size. It is possible that the sort of problems for user flows that push a lot of data can differ from those of small data transfers.

FIG. 5B illustrates a modified first visual overlay 450 based on the secondary global filter selections shown in FIG. 5A. As shown, the first and second line graphs 432, 434 have different profiles with the chart 430 that reflect user flows meeting the specified secondary global filtering criterium. The search summary 418 is updated to reflect the entered secondary global filter values. In addition to the chart 430, the process user flow summaries 480, 490 are updated according to newly entered secondary global filter values.

Figure 6:
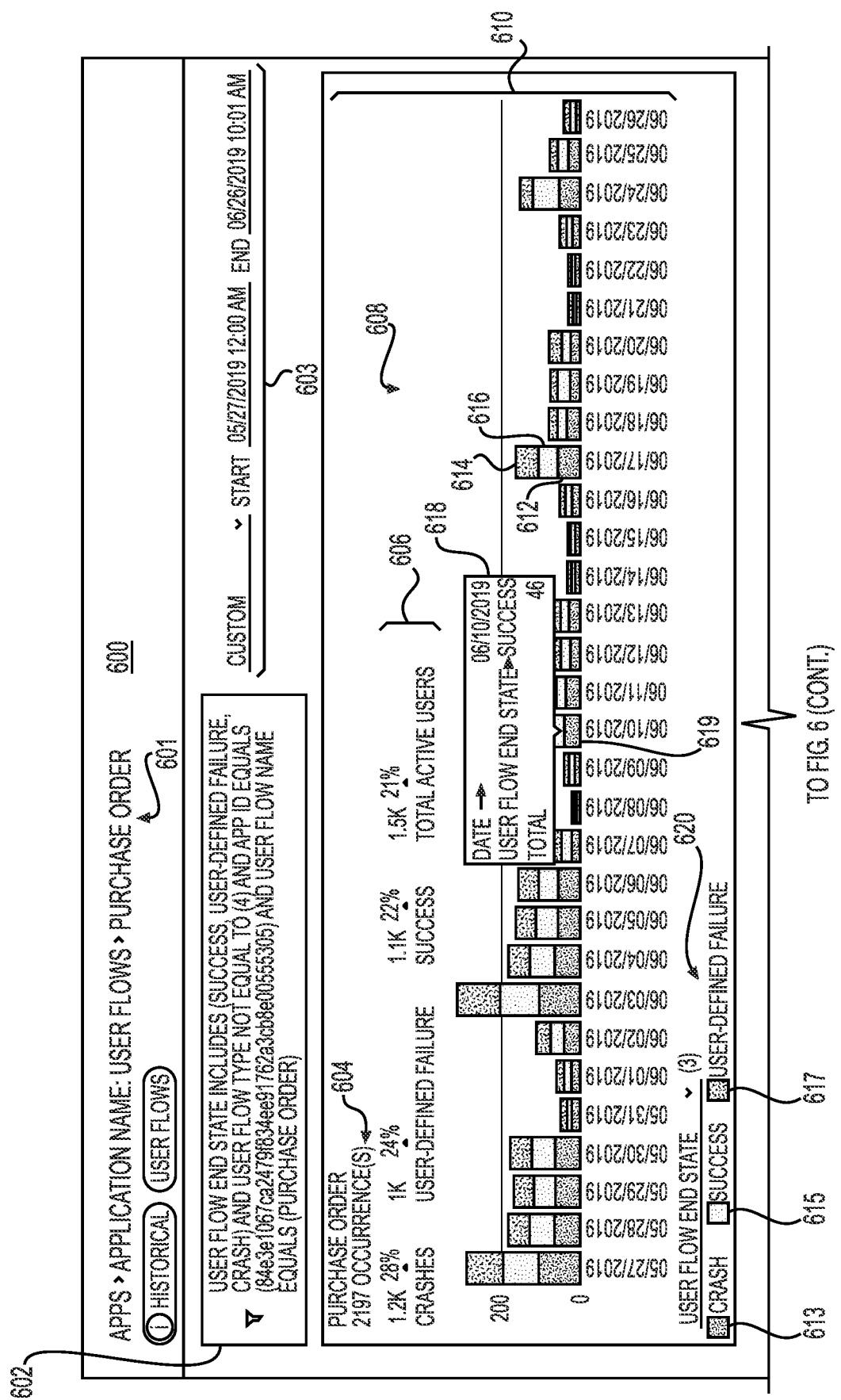
FIG. 6 is an example illustration of a GUI for providing a visual overlay for user flow insights for a single selected process of an application.
Figure 6:
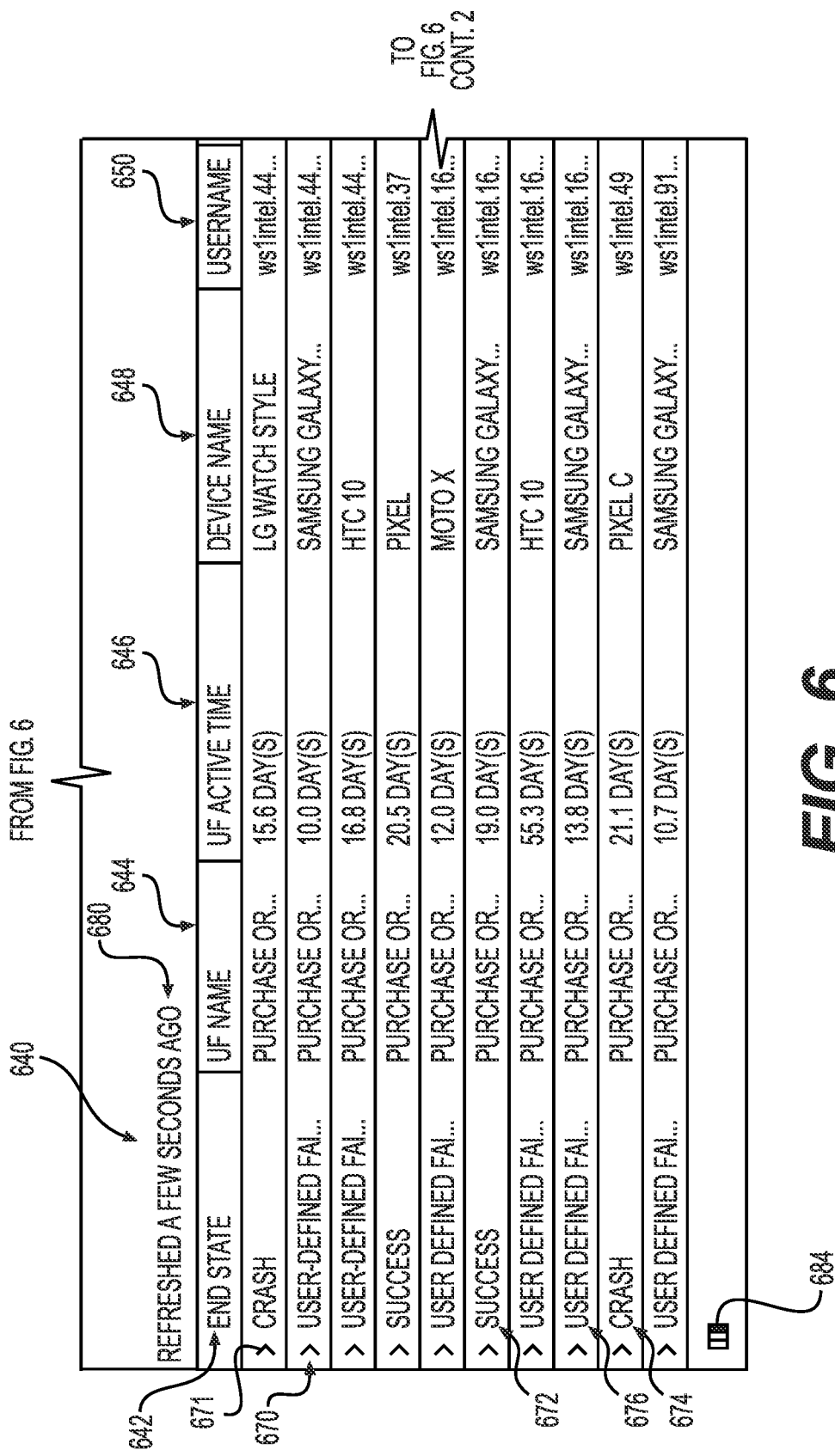

FIG. 6 is an illustration of a second screen 600 that includes a second visual overlay 610 that can be generated with the selection of a process user flow summary from the first screen 400. The screen includes a process identifier section 601, a search summary section 602, and a user modifiable time range section 603. FIG. 6 illustrates the second visual overlay 610 subsequent to a selection of the first process user summary 480, the purchase order application process. The second visual overlay 610 includes a total user flow summary section 604, statistical summary section 606, and a chart 608 within a first pane and a user flow entry log 640 in a second pane (spanning FIG. 6 Cont. and FIG. Cont. 2).

The total user flow summary section 604 can provide the total number of user flows, irrespective of user flow end state, in an example. The numbers for user flows can be represented in the chart 608 for the purchase order process that was selected on the first screen 400 (and is identified in the process identifier section 601). The statistical summary section 606 can separately provide a number and percentage of the total user flow occurrences for the purchase order process that ended in a crash, user-defined failure, and a success over the time period specified in the time range section 603. In addition, the statistical summary section 606 can include a total number of users that were involved with the user flows ("purchase order process users") summarized in the second screen 600. More specifically, this number represents the number of enterprise users that initiated, or requested, or otherwise provided input that drove the implementations of the purchase order application process, which generate the user flows summarized in the second visual overlay 610. In one example as shown in FIG. 6, the statistical summary section 606 can also provide what percentage of a total number of enterprise users the number of purchase order process users equates to.

The chart 608 is an exemplary representation of how the successful and unsuccessful user flows for the purchase order application process may be presented in the second visual overlay 610. In this example, composite bars corresponding to each day between May 27th to June 26th are shown. These days can be indicated by specific dates as shown. The thirty (30) days can represent a first user selected time range. The time range can be set based on a time unit (e.g., day) and number of time units (30). But other time intervals, such as hours, weeks, and months can be selected for the first time range in an example. Likewise, different numbers of time units can be selected.

Each day in this example has its own composite bar indicating a number of user flows ending with a crash, a user-defined failure, and a success. Thus, each composite bar includes an overlay of a crash info bar 612, a success info bar 616, and a user-defined failure info bar 614. For example, the bar for the Jun. 17, 2019 shows all three information bars 612, 614, 616, which may be presented with respective colors and/or graphical fill profiles. The second visual overlay 610 also includes an end state legend 620 which informs that bars having an appearance matching a graphical profile of a crash icon 613, a success icon 615, and a user-defined failure icon 617 respectively correspond to crash, success, and user defined failure info bars 612, 614, 616. With this graphical detail, an administrative user can quickly identify periods with a high number of user flow occurrences, as well as compare user flow states from a proportional and time perspective.

In one example, hovering over or selecting any of the info bars can reveal additional details. For example, hovering over a success info bar for the composite bar for June 10th can cause a box 618 to appear. The box 618 can reveal the date, a corresponding user flow end state (success), and a total number of user flows on that date resulting in the end state (46). If the user moves over to a different info bar for that date, the same information with respect to a user flow end state of that info bar can be displayed. In another example, each hovering over a particular location on a composite bar (upper- or lower-most horizontal line), or a date on the X-axis, can result in a box appearing that shows total user flow occurrences and a breakdown of each end state for the hovered over date.

FIG. 6 Cont. and FIG. Cont. 2 illustrate the user flow entry log 640 ("log 640"), which provides a low-level research tool specific to a particular application process that can be accessed from the first screen 400. The log 640 can include information about user flows, including an end state 642, application process name 644, active time between a start and an end state 646, a device name 648, a username 650, application version 652, device model 654, platform 656, SDK device ID 658, application identifier 660, and start and end times 662, 664.

In one example, the log 640 can be sorted using one or more of categories as a sort option. Using these sort options can cause error entries of interest to the user to rise to the top of the log 640. It may be advantageous to sort the user flow entries 670 by end state 642, active time 646, application version 652, or platform 656 to quickly see, for example, which application versions user flows for the selected application process take the most or least amount of time, or result in successful user flows.

The above information can be provided for each user flow entry 670 in the log 640; the entries corresponding to the user flows graphically represented in the chart 608. Accordingly, entries for user flows having a successful, user-defined error, and application crash state 672, 674, 676, not just failures, can be included in the log 640. An end state indicates whether a user flow was a success or not, and if not, what type of failure occurred. Thus, by viewing the log 640, a user can look at user flow failures or successes to see, for example, if they are grouped together during a single time period, or if they are dispersed throughout the entire period being analyzed. Other anomalies with respect to active time, platform, device model, or application version, can also be identified.

The log 640 includes a last refresh time 680 and several options that allow a user to view more specific, additional, or different information with respect to the user flow entries 670. For example, each user flow entry 670 can include an expansion option 671 that, as described in more detail with respect to FIGS. 7A-C, allows a user to view events in a series of events that defines the expanded user flow. A log configuration control section 682 is provided and can include a number of entries to display option, total number of entries summary, and a page selector that can be used to cycle through entries.

In addition, the log 640 may provide a data category selector 684 and a user flow entry configuration option 686. A user can use the data category selector 684 to show or remove data categories on the second screen 600. This means a user can configure the log 640 with respect to data that, at a minimum, has already been pulled by the management server from event information that the server has received. On the other hand, the entry configuration option 686 can be used to bring up a window described in more detail with respect to FIG. 8. This new window can provide a user with options for selecting different data categories the management server is not currently gathering user flow data on. Accordingly, the entry configuration option 686 can allow the user to define the information that is included in an entry (also known as a "breadcrumb") for all user flows (successful or otherwise).

Figure 7A:
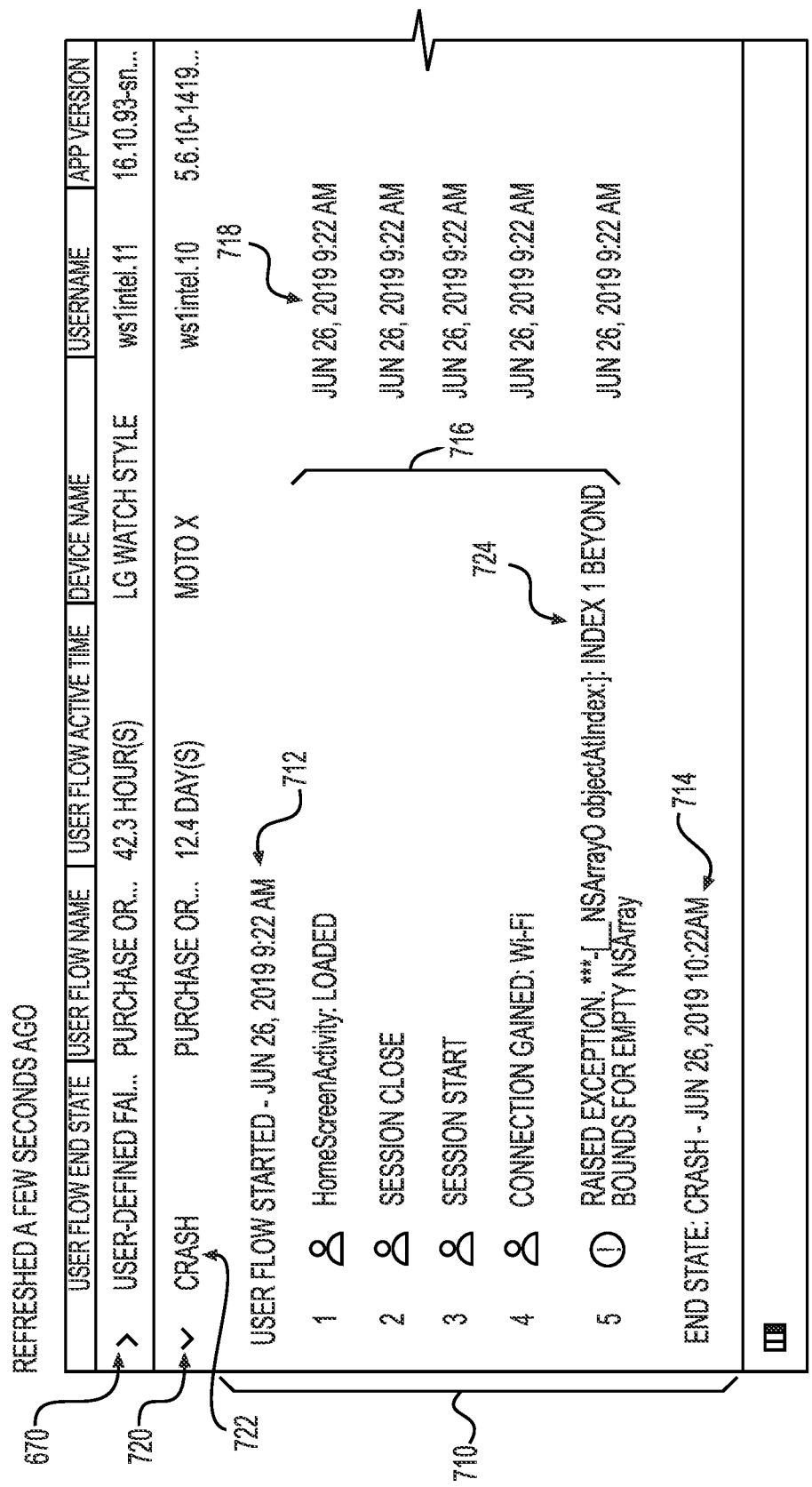
FIGS. 7A, 7B, and 7C are example illustrations of expanded user flow log entries.
Figure 7B:
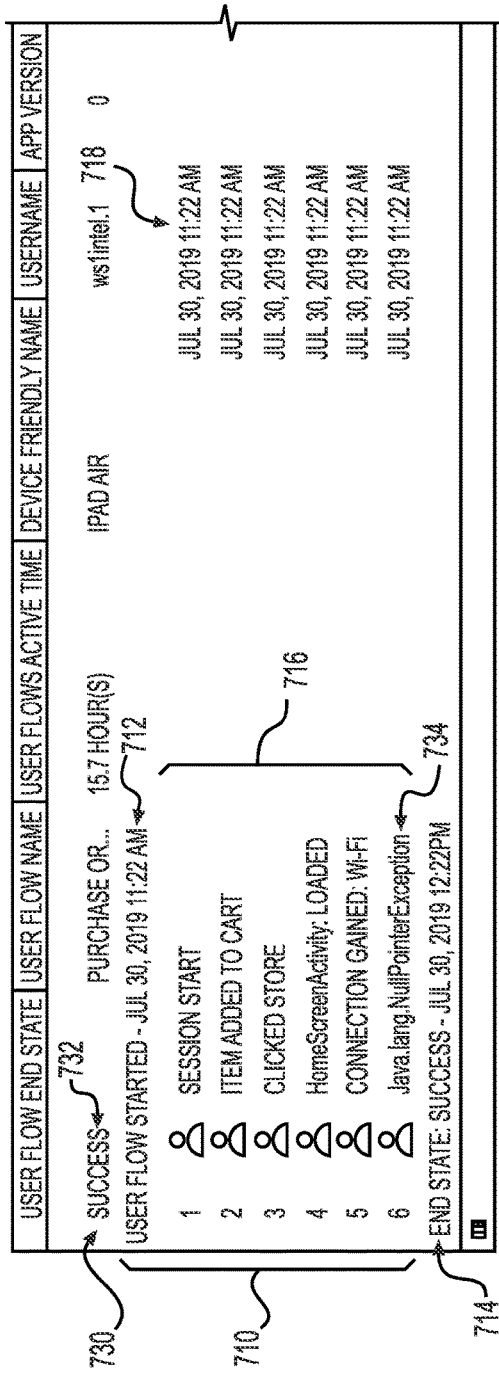
Figure 7C:
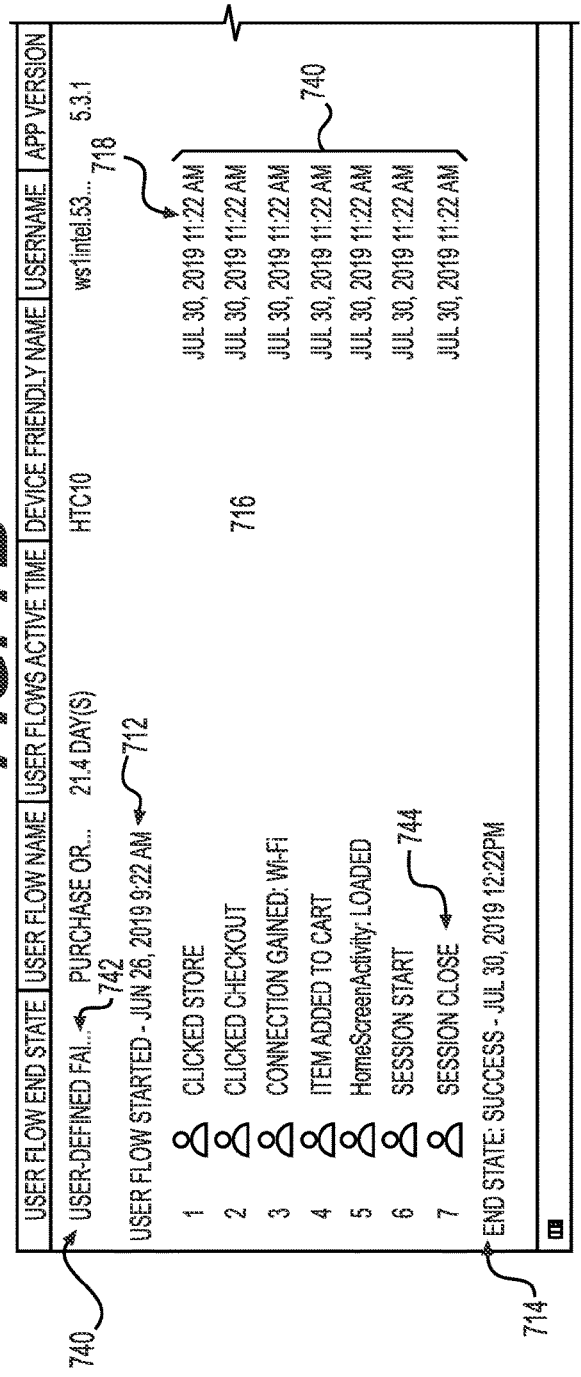

FIGS. 7A, 7B, and 7C are example illustrations of expanded user flow log entries that display events for corresponding user flows. Accordingly, each of FIGS. 7A, 7B, and 7C shows a visualization of a user flow summary generated, for example in stages 330 to 344 of FIG. 3A. For example, the user flow summary can be for a respective implementation of the purchase order application process of FIG. 4-FIG. 6 Cont. 2. More specifically, FIGS. 7A, 7B, and 7C show user flow summaries 710 for first, second, and third user flows 720, 730, 740 for which a purchase order process respectively ended with an application crash, a success, and a user-defined error. Each user flow summary 710 includes a start time display 712, an end state display 714, a listing of events 716, and a listing of times 718 that reveal when each event took place.

With each entry within the event listings, an operation, milestone, type of user input received, output provided, or operation requested for that event as part of a respective user flow is described. Having event information available on such a granular level allows an administrator user to pinpoint operations that may be detrimental or advantageous to a repeated success or failure of an application process. This may even be the case where events before and after a particular event have a high degree of variability across a large number of user flows. For example, the user may be able to look at user flow summaries for user flows occurring before and after an update to an application, and identify a common event operation in one of those groups user flows and determine the operation contributed to a particular end state in a majority of the user flows included in the group analyzed.

First, second, and third user flow end state values 722, 732, 742 for the first, second, and third user flows 720, 730, 740 match an end state 714 displayed in each respective user flow summary. In addition, the end state display 714 includes a time when a respective end state for a user flow occurred or was otherwise recognized. It will be noted that the end state times are not the same as time record for first, second, and third end events 724, 734, 744. The event information can be particularly useful for identifying end events that cause user flows to be successful, fail by crashing the application, or fail by causing a user to abandon a process or attempt an operation that caused a time out or crash.

Figure 8:
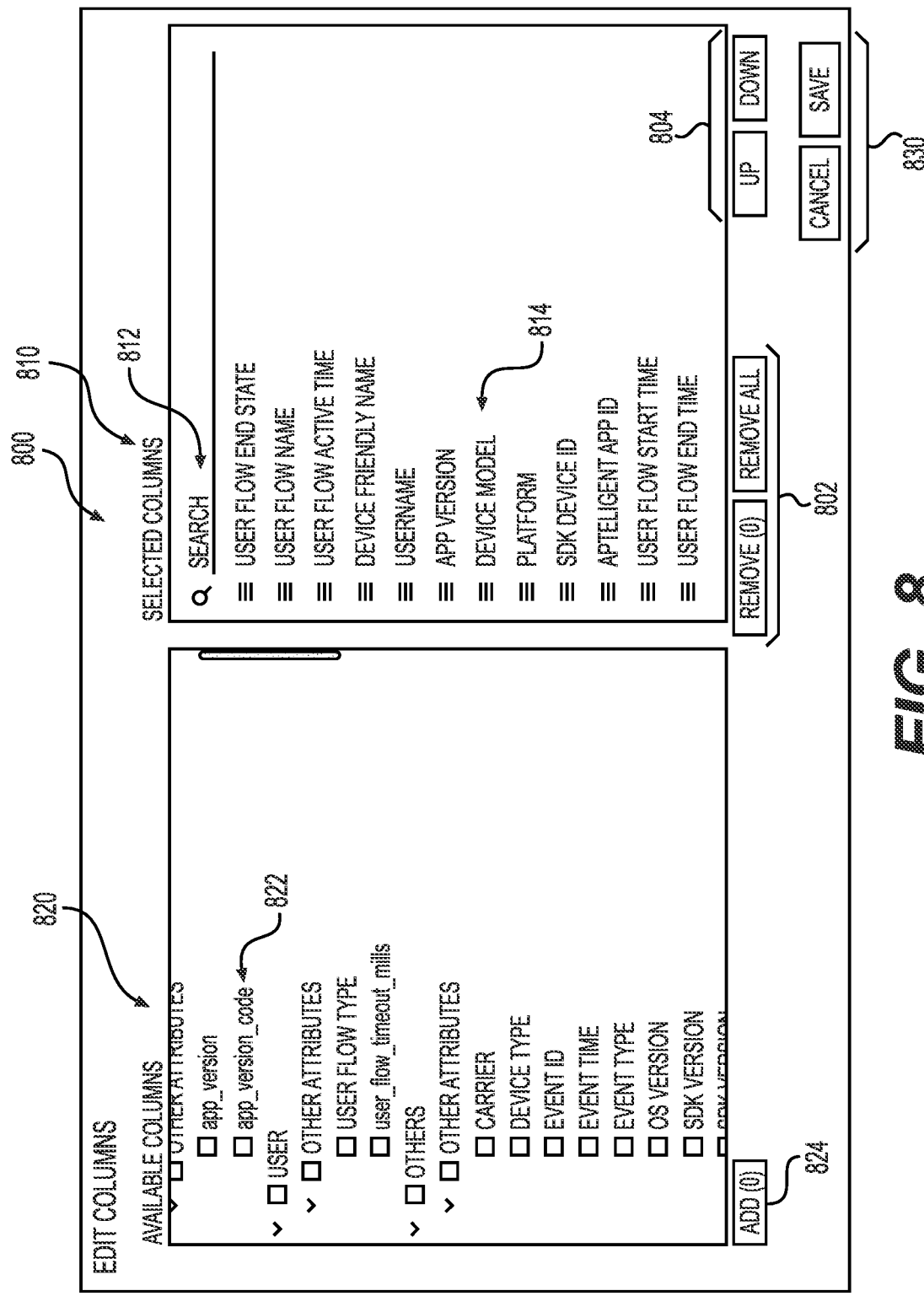
FIG. 8 is an example illustration of a selection menu for modifying data categories for which data is pulled in relation to events occurring during process implementations.

FIG. 8 is an example illustration of a selection menu 800 for modifying data categories. The data categories can define which user flow information is collected in relation to events that occur during application execution. The selection menu 800 can be accessed with a selection of the user flow entry configuration option 686 on the second screen 600. The selection menu includes a selected-columns section 810 with first controls 802 for removing columns, and second controls 804 changing an order of columns 814 previously or newly added to the selected columns section. A search option 812 is also provided. The selection menu further includes an available-columns section 820 and a third control 824 for adding columns from this section to the selected-columns section 810.

The available columns 822 can represent data categories that correspond to data that was not included in the packaged user flow information provided to an admin device by a management server, for example in stage 348 of FIG. 3A. Further, these columns can correspond to data that was not included in the event information provided to the management server in stage 330 or gathered by the SDK in stage 314, because that data was not requested by the management server in stage 310. Accordingly, selection of one of these columns can cause the management server to access SDKs on client devices and cause the SDK to either provide data directly or pull data from the application to provide to the management server. In this way, an administrative user can define the information gathered to characterize successful and unsuccessful user flows corresponding to discrete implementations of application processes.

In another example, an added column may correspond to data that was provided in stage 330, but not included with the user flow information provided in stage 348. Accordingly, the management server may be able to repackage the previously provided user flow information with data corresponding to the added column.

Figure 9A:
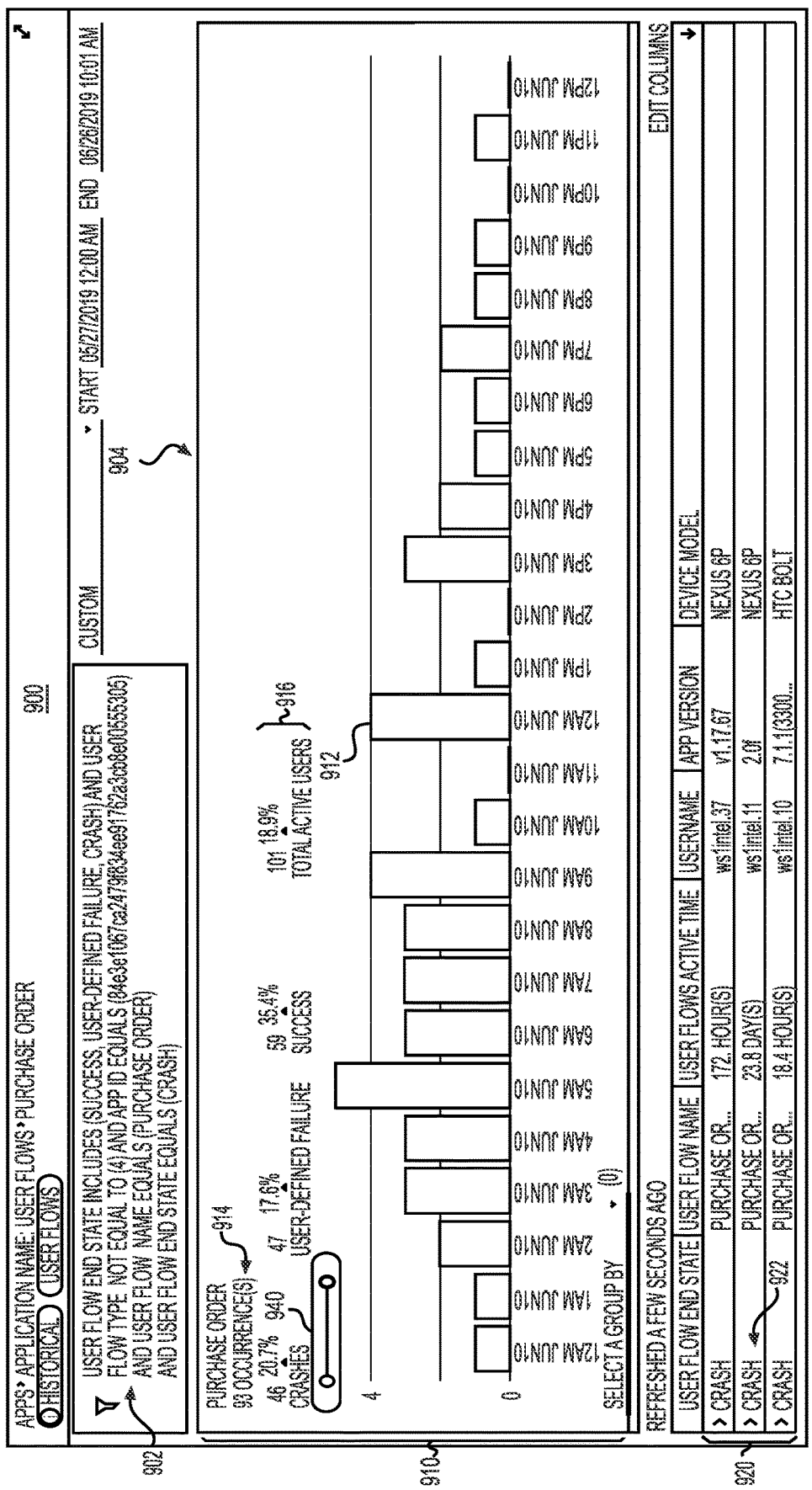
FIGS. 9A and 9B are example illustrations of a GUI that provides user flow insights over different periods of time based on selections from preceding visual overlays.
Figure 9B:
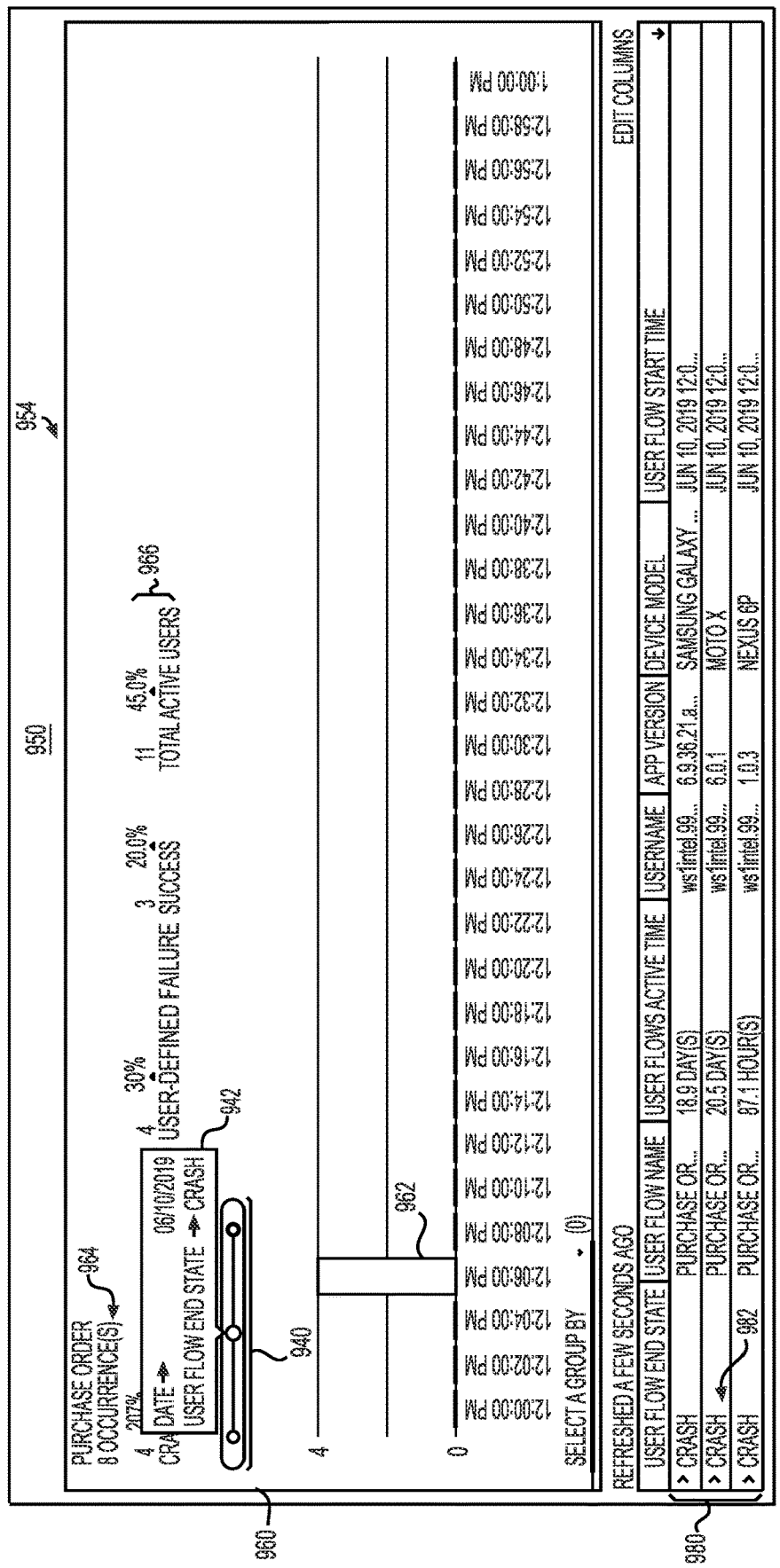

FIGS. 9A and 9B are example illustrations of a GUI that provides user flow insights over different periods of time based on selections from preceding visual overlays. FIG. 9A shows a third screen 900 that may be generated from a selection of a composite or an info bar provided on the second screen 600. More specifically, the third screen 900 is generated and displayed as a result of a user selection of the crash info bar 619 for Jun. 10, 2019, provided in the second visual overlay 610. The third screen 900 displays a search summary string 902 and a third visual overlay 904. The third visual overlay 904 includes a chart 910 and a user flow entry log 920 with select data category columns.

The chart 910 visually represents the user flows occurring over the time period for the crash info bar 619 that was selected. Thus, the chart 910 depicts the user flows that ended with an application crash end state on Jun. 10, 2019. The chart 910 includes bars 912 that represent a total number of user flows matching a criterium of the search summary string 902, for each increment of time (e.g., one hour) for a total period of time (e.g., twenty-four hours) represented by the X-axis of the chart 910. The chart 910 further includes a total user flow occurrences summary 914 and third overlay statistical summary 916.

The total user flow occurrences summary 914 reflects the total number of user flow occurrences having a crash or user-defined error end state over the period of time represented in the chart 910. The third overlay statistical summary 916 represents a mix of information that is, and is not, represented by the bars 912 of the chart 910. As specified above, and as can be gleaned from the search summary string 902 in FIG. 9A, the third screen 900 is intended to provide visual information regarding purchase order process user flows with an application crash as a user flow end state. The number and percentage provided over the crashes section of the third overlay statistical summary 916 directly correspond to the user flow information depicted in the chart 910. However, in this example, chart 910 does not depict or reflect information corresponding to the statistics for total active users, successful user flows, or user-defined failure user flows also provided in the third overlay statistical summary 916. The values provided for those sections are provided for reference as they relate to user flows occurring over the same time period represented by the chart 910.

The user flow entry log 920 for the third visual overlay 904 provides the same functionality as the log 640 of FIG. 6 Cont. and FIG. 6 Cont. 2. The entries in the log 920 are specific to the user flows represented in the chart 910. The entries represent the forty-six (46) user flows that occurred on Jun. 10, 2019, with an end state of an application crash. Thus, the log 920 will have forty-six (46) user flow entries 922, each of which capable of being expanded to reveal event information as shown in FIGS. 7A-C, particularly with respect to FIG. 7A.

The chart 910 also includes a navigation control 940 that informs an administrative user what level of detail is presented on the screen, at least relative to the second screen 600 of FIG. 6, FIG. 6 Cont., and FIG. 6 Cont. 2. As described in more detail with respect to FIG. 9B, the navigation control 940 may be used to go between second, third, and fourth screens 600, 900, 950.

FIG. 9B shows a fourth screen 950 that may be generated from a selection of a bar 912 provided on the third screen 900. More specifically, the fourth screen 950 is generated and displayed as result of a user selection of the bar for 12 AM of June 10 provided in the chart 910 of the third visual overlay 904. The fourth screen 950 can display a search summary string (not shown) and a fourth visual overlay 954. The fourth visual overlay 954 includes a chart 960 and a user flow entry log 980. The log 980 including expandable user flow entries 982 specific to user flows of a bar selected in the third visual overlay 904.

Similar to the third visual overlay 904, the chart 980 of the fourth visual overlay includes bars 962 that represents a total number of user flows matching a criterium of the search summary string, for each increment of time (e.g., two minutes) and for a total period of time (e.g., one hour) represented by the X-axis of the chart 960. The chart 960 further includes a total user flow occurrences summary 964 and fourth overlay statistical summary 966.

The fourth visual overlay 954 also includes the navigation control 940 extended to include a third level. The third level conveys a level of detail (a "drill down" level) represented by the fourth visual overlay 954 relative to the second visual overlay 610 presented in FIG. 6. The levels of the navigation control 940 can be hovered over to obtain summary and identifying information regarding a time scale the level corresponds to. In addition, the levels may be selected for navigation between the second, third, and fourth screens 600, 900, 950.

Figure 10:
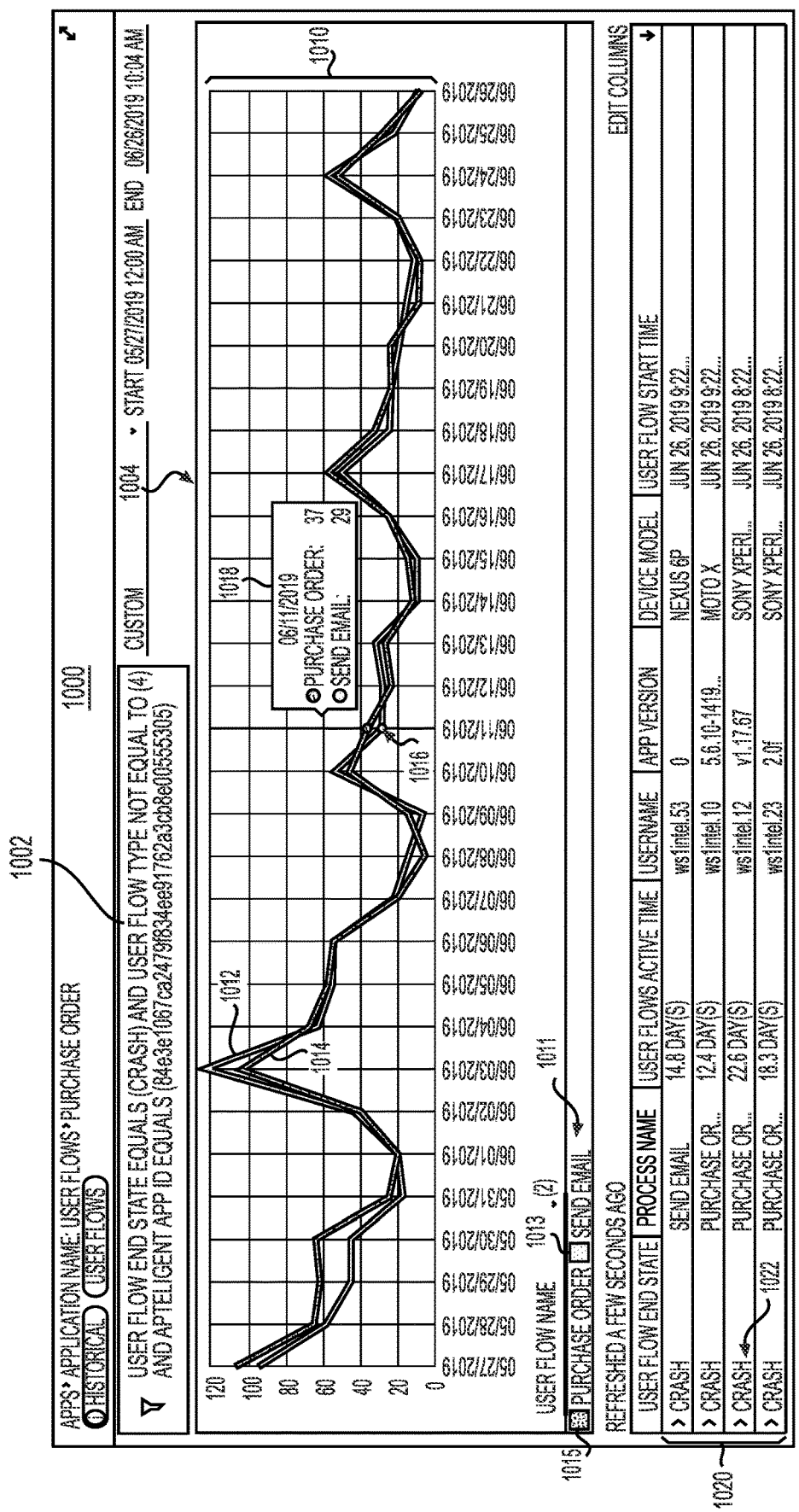
FIG. 10 is an example illustration of a GUI for providing user flow insights with regard to multiple application processes and unsuccessful user flows.

FIG. 10 shows a fifth screen 1000 that may be generated from a selection of the detail view option 479 provided in the first screen 400. The fifth screen 1000 displays a search summary string 1002 and a fifth visual overlay 1004 specific to user flows having application crash end states. The fifth visual overlay 1004 includes a chart 1010 and a user flow entry log 1020 with select data category columns. The chart 1010 is an exemplary representation of user flows having a crash end state for both the purchase order and send email application processes over a time range. As shown, the time range can be set based on a time unit (e.g., day) and number of time units (thirty (30)). But other time intervals, such as hours, weeks, and months can be selected for the first time range in an example. Likewise, different numbers of time units can be selected.

The chart 1010 visually represents the user flows that: (A) have a crash end state; (B) occurred over a specified time period; and (C) correspond to implementations of the process order and send email application processes. In particular, the chart 1010 includes a first line graph 1012 for the send email application process, and a second line graph 1014 for the purchase order application process. A legend 1011 includes send email and purchase order icons 1013, 1015 that correspond to and inform a user which line graph represents a particular process.

In one example, a user can hover over a portion of the chart in the area of either line graph 1012, 1014 and cause a summary box 1018 to be displayed. As shown, information provided in the summary box 1018 can include a total number of user flows having a crash end state for a particular date (Jun. 11, 2019).

The user flow entry log 1020 for the fifth visual overlay 1004 provides the same functionality as the log 640 described with reference to FIG. 6 Cont. and FIG. 6 Cont. 2. The difference being the entries in the log 1020 are specific to the user flows represented in the chart 1010 and are associated with more than one application process. Each of user flow entries 1022 can be expanded to reveal event information as shown in FIGS. 7A-C.

In one example, the fifth visual overlay 1004 can be modified within the fifth screen 1000, and thus without presenting a new screen, by a selection of one of the line graphs 1012, 1014 or one of the icons 1013, 1015. For example, selecting the first line graph 1012 or the send email icon 11011 is selected by a user can cause the chart 1010 to only show the first line graph, and log 1020 to include only the user for entries for the send email application process. In another example, a selection of a line graph or an icon is not necessary to view, at least temporarily, user flow information exclusively for only one application process. In particular, a user may hover over an icon or a line graph to cause a line graph and user flow entries for the process not being hovered over, to be withdrawn from fifth screen 1000.

Figure 11:
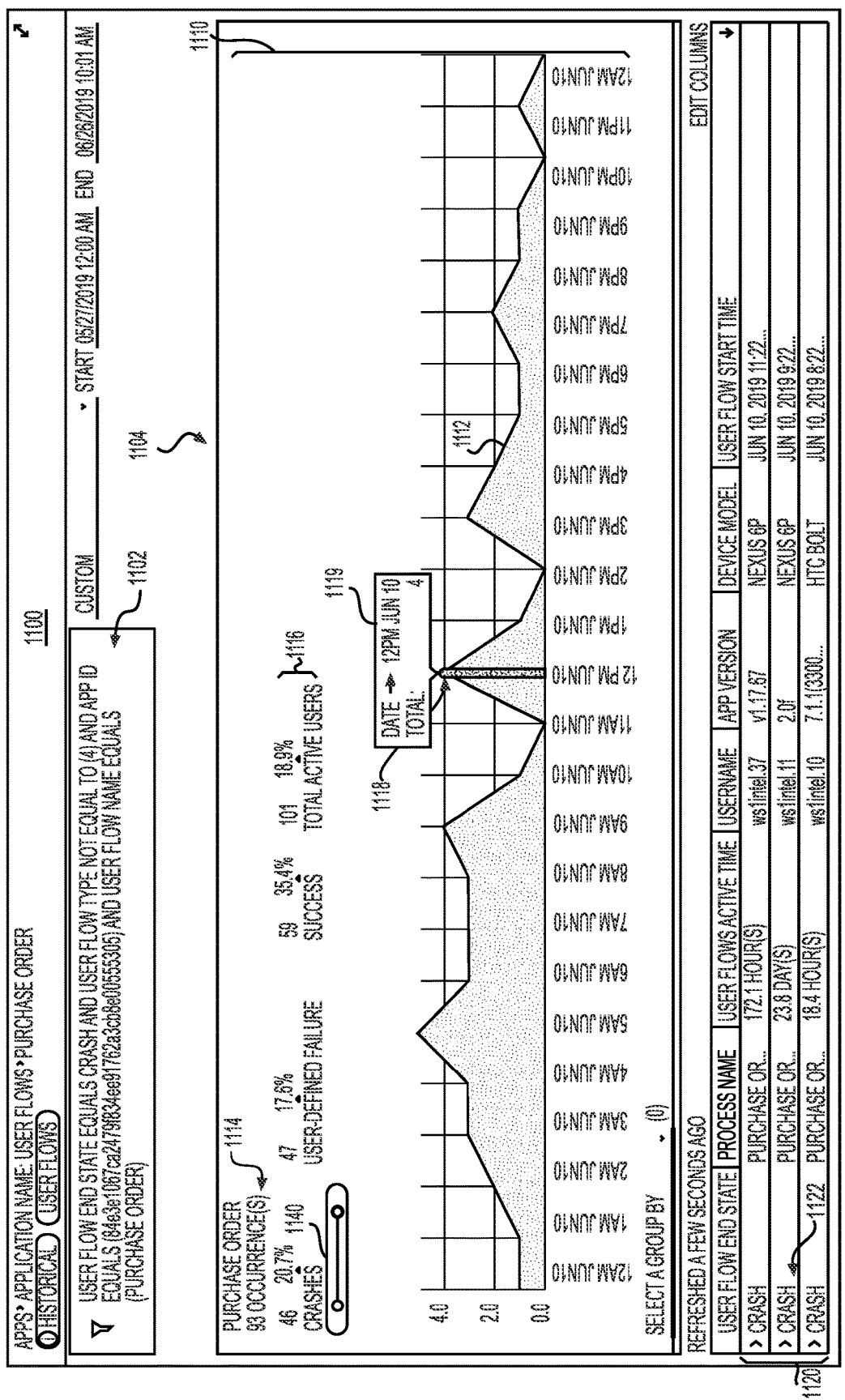
FIG. 11 is example illustration of a GUI that provides detailed user flow insights based on a selection from a preceding visual overlay.

FIG. 11 is example illustration of a GUI that provides user flow insights for crash end state user flows based on a selection from a preceding visual overlay. A sixth screen 1100 of FIG. 11 may be generated from a selection of a point along a line graph in chart 1010 of the fifth visual overlay 1004. More specifically, a sixth visual overlay 1104 of the sixth screen 1100 can be generated for a selection of a point on the second line graph 1014 for the date of Jun. 10, 2019.

The sixth visual overlay 1104 includes a chart 1110 and a user flow entry log 1120 with select data category columns. The chart 1110 includes a line graph 1112, a total user flow occurrences summary 1114, a third overlay statistical summary 1116, and a navigation control 1140. The line graph 1112 plots user flows for the purchase order process having a crash end state over a twenty-four hour time period occurring on the previously selected date of Jun. 10, 2019. Hovering over a point or a portion 1118 of the line graph can result in a box 1119 being displayed that provides a total number of user flows with a crash end state that occurred at a time (12 PM) corresponding to the hovered-over data point. The log 1120 includes expandable user flow entries 1122 specific to a point selected from the fifth visual overlay 1004.

Figure 12:
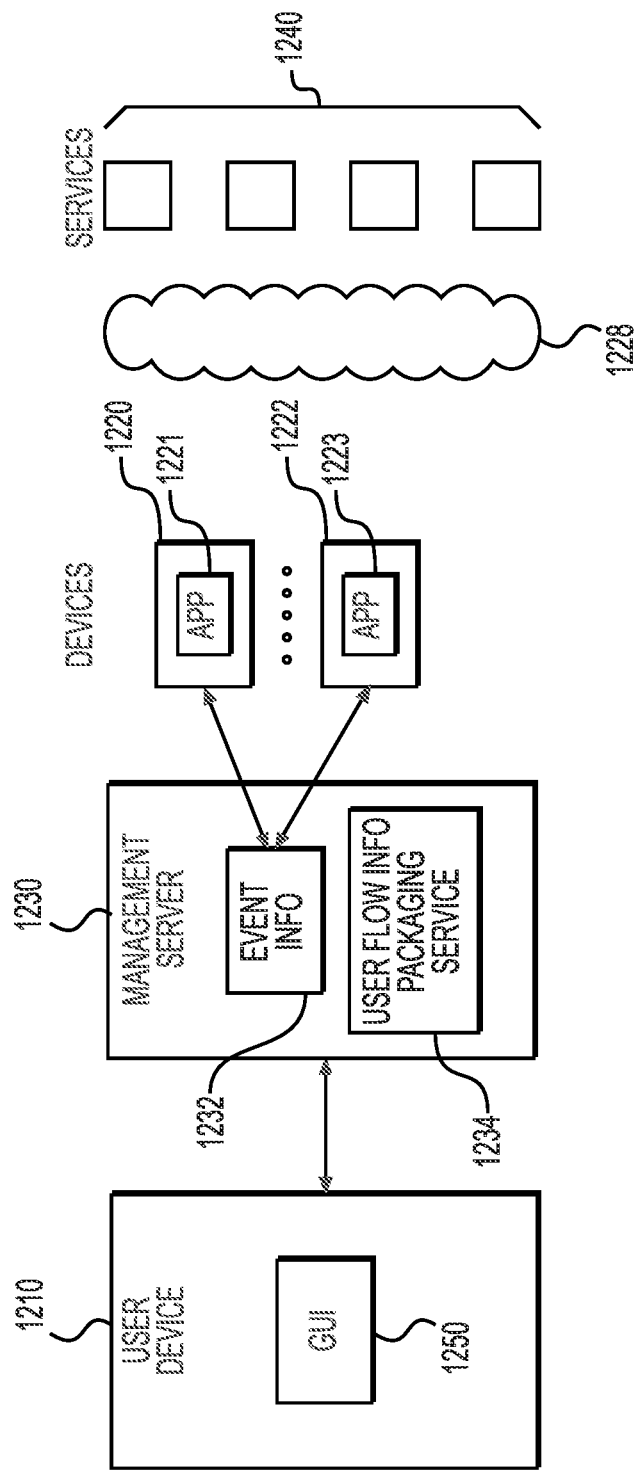
FIG. 12 is an illustration of example system components for providing visual overlays for user flow insights.

FIG. 12 is an illustration of example system components used for visualizing user flows on a GUI. In one example, many client devices 1220, 1222 can execute an application 1221, 1223. These applications 1221, 1223 can be the same or different versions. Additionally, the client devices 1220, 1222 can be various device models and run different OS versions, in an example. The client devices 1220, 1222 can be any processor-enabled device, such as a tablet, phone, laptop, or personal computer. As part of implementing various processes during respective executions, the applications 1221, 1223 can make various network calls over a network 1228, such as the internet or an intranet. These network calls can be to any number of different network services 1240, also referred to as hosts. Network services 1240 can each include one or more processes that can be summarized in the visual overlays described herein.

The applications 1221, 1223 can implement an SDK in one example. The SDK can specify what data the applications 1221, 1223 collect. This can include user flow data and can also include network request information. The client devices 1220, 1222, through respective SDKs, can store event information for batch upload to a management server 1230. In one example, sensitive or irrelevant information is stripped out of the event information before storing it locally or sending it to the management server 1230. For example, passwords can be removed. The applications 1221, 1223 or agents on the client devices can be responsible for storing the event information. The SDK can, for example, include methods for storing the right subset of information each time an event occurs.

Periodically, the applications 1221, 1223 can report, via respective SDKs, the event information to the management server 1230. The management server 1230 can include one or more servers, each having one or more processors. The management server 1230 can organize and store the event information 1232 according to attributes of identified events, such as application version, device type, OS type, and request protocol. Action or operation and timestamp information included in respective event information 1232 for each identified event can then be processed by a packaging service 1234 for the management server. As a result, the packaging service 1234 can group events into user flows and package corresponding event information for those events into user flow information. In turn, the user flow information can be accessed by an administrative user device 1210 that executes the GUI 1250.

The GUI 1250 can be part of an analytics suite and can display user flow insights, such as those described above. The administrative user device 1210 can be any processor-enabled device, such as a laptop, tablet, phone, or personal computer. The administrative user device 1210 can display the GUI 1250 by running a local analytics application or a web-based analytics application. The analytics application can provide appropriate credentialing to the management server 1230 to access the relevant event information 1232.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing user flow insights relative to application process implementations, the method comprising:
   receiving, with a server, event information corresponding to events occurring on a plurality of devices as part of processes implemented by applications on the plurality of devices;
   identifying a series of events based on event status and timestamp information included in the event information, the series of events defining a user flow that corresponds to an implementation of one of the processes;
   packaging portions of the event information corresponding to one or more series of events into user flow information based at least on the timestamp information, the user flow information defining one or more user flows;
   classifying a first portion of user flows for a first process as successful user flows and a second portion of user flows for the first process as unsuccessful user flows;
   transmitting the first and second portions of user flows from the server to a user device that includes a graphical user interface ("GUI");
   displaying, on the GUI, graph that compares the successful user flows and the unsuccessful user flows for the first process over a period of time; and
   in an instance where a user selects a graphical element associated with one of the unsuccessful user flows for the first process, displaying, on the GUI:
      a series of events representing the unsuccessful user flow; and
      a device type related to the series of events.

2. The method of claim 1, wherein multiple events in the respective series of events, as respectively displayed in the GUI, include a timestamp used for the packaging and one of a user activity and a result of a user activity.

3. The method of claim 1, further comprising indicating within the listing, individual user flows are one of successful and unsuccessful based on end states associated with respective last events of the individual user flows.

4. The method of claim 3, wherein the visual overlay includes overlapping bar chart information visually representing relative user flow successful and unsuccessful end states for discrete increments of time during a specified period of time.

5. The method of claim 1, further comprising determining, for each event, an event status according to an action type and a timestamp associated with the event, the event status indicating the event is one of a start event, a post-start event, and an end event.

6. The method of claim 1, further comprising displaying a timestamp next to each event in the displayed series of events.

7. The method of claim 1, wherein the classifying comprises determining whether an end state for each series of events comprises a crash or a success, and classifying the series according to the end state.

8. A non-transitory, computer-readable medium comprising instructions that, when executed by a processor, perform stages for providing user flow insights relative to application process implementations, the stages comprising:
   receiving, with a server, event information corresponding to events occurring on a plurality of devices as part of processes implemented by applications on the plurality of devices;
   identifying a series of events based on event status and timestamp information included in the event information, the series of events defining a user flow that corresponds to an implementation of one of the processes;
   packaging portions of the event information corresponding to one or more series of events into user flow information based at least on the timestamp information, the user flow information defining one or more user flows;
   classifying a first portion of user flows for a first process as successful user flows and a second portion of user flows for the first process as unsuccessful user flows;
   transmitting the first and second portions of user flows from the server to a user device that includes a graphical user interface ("GUI");
   displaying, on the GUI, graph that compares the successful user flows and the unsuccessful user flows for the first process over a period of time; and
   in an instance where a user selects a graphical element associated with one of the unsuccessful user flows for the first process, displaying, on the GUI:
      a series of events representing the unsuccessful user flow; and
      a device type related to the series of events.

9. The non-transitory, computer-readable medium of claim 8, wherein multiple events in the respective series of events, as displayed in the GUI, includes a timestamp used for the packaging and one of a user activity and a result of a user activity.

10. The non-transitory, computer-readable medium of claim 8, further comprising indicating within the listing, individual user flows are one of successful and unsuccessful based on end states associated with respective last events of the individual user flows.

11. The non-transitory, computer-readable medium of claim 10, wherein the visual overlay includes overlapping bar chart information visually representing relative user flow successful and unsuccessful end states for discrete increments of time during a specified period of time.

12. The non-transitory, computer-readable medium of claim 8, the stages further comprising determining, for each event, an event status according to an action type and a timestamp associated with the event, the event status indicating the event is one of a start event, a post-start event, and an end event.

13. The non-transitory, computer-readable medium of claim 8, the stages further comprising displaying a timestamp next to each event in the displayed series of events.

14. The non-transitory, computer-readable medium of claim 8, wherein the classifying comprises determining whether an end state for each series of events comprises a crash or a success, and classifying the series according to the end state.

15. A system for providing user flow insights relative to an application, comprising:
   a non-transitory, computer-readable storage medium that includes instructions; and a processor that executes the instructions to perform stages comprising:

receiving, with a server, event information corresponding to events occurring on a plurality of devices as part of processes implemented by applications on the plurality of devices;

identifying a series of events based on event status and timestamp information included in the event information, the series of events defining a user flow that corresponds to an implementation of one of the processes;

packaging portions of the event information corresponding to one or more series of events into user flow information based at least on the timestamp information, the user flow information defining one or more user flows;

classifying a first portion of user flows for a first process as successful user flows and a second portion of user flows for the first process as unsuccessful user flows;

transmitting the first and second portions of user flows from the server to a user device that includes a graphical user interface ("GUI");

displaying, on the GUI, graph that compares the successful user flows and the unsuccessful user flows for the first process over a period of time; and in an instance where a user selects a graphical element associated with one of the unsuccessful user flows for the first process, displaying, on the GUI:

a series of events representing the unsuccessful user flow; and a device type related to the series of events.

16. The system of claim 15, wherein multiple events in the respective series of events, as displayed in the GUI, includes a timestamp and one of a user activity and a result of a user activity.

17. The system of claim 15, the stages further comprising indicating within the listing, individual user flows are one of successful and unsuccessful based on end states associated with respective last events of the individual user flows.

18. The system of claim 17, wherein the visual overlay includes overlapping bar chart information visually representing relative user flow successful and unsuccessful end states for discrete increments of time during a specified period of time.

19. The system of claim 15, the stages further comprising determining, for each event, an event status according to an action type and a timestamp associated with the event, the event status indicating the event is one of a start event, a post-start event, and an end event.

20. The system of claim 15, the stages further comprising displaying a timestamp next to each event in the displayed series of events.

* * * * *